United States Patent [19]
Frankel et al.

[11] Patent Number: 6,035,041
[45] Date of Patent: *Mar. 7, 2000

[54] OPTIMAL-RESILIENCE, PROACTIVE, PUBLIC-KEY CRYPTOGRAPHIC SYSTEM AND METHOD

[75] Inventors: Yair Frankel, Ridgewood, N.J.; Marcel M. Yung, New York, N.Y.

[73] Assignee: CertCo, Inc., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/842,080

[22] Filed: Apr. 28, 1997

[51] Int. Cl.$^7$ .................................. H04L 9/08; H04L 9/30
[52] U.S. Cl. ............................. 380/30; 380/286; 380/28; 713/180
[58] Field of Search .................................. 380/21, 30, 45, 380/49, 25, 28, 29

[56] References Cited

U.S. PATENT DOCUMENTS

| | | | |
|---|---|---|---|
| 4,888,801 | 12/1989 | Foster et al. | 380/21 |
| 5,005,200 | 4/1991 | Fischer | 380/30 |
| 5,224,163 | 6/1993 | Gasser et al. | 380/30 |
| 5,412,723 | 5/1995 | Canetti et al. | 380/21 |
| 5,469,507 | 11/1995 | Canetti et al. | 380/30 |
| 5,481,613 | 1/1996 | Ford et al. | 380/30 |
| 5,495,532 | 2/1996 | Killian et al. | 380/30 |
| 5,588,061 | 12/1996 | Ganesan et al. | 380/30 |
| 5,625,692 | 4/1997 | Herzberg et al. | 380/21 |
| 5,708,714 | 1/1998 | Lopez et al. | 380/25 |
| 5,764,767 | 6/1998 | Beimel et al. | 380/21 |
| 5,867,578 | 2/1999 | Brickell et al. | 380/23 |

OTHER PUBLICATIONS

Paul Feldman "A Practical Scheme for Non–Interactive Verifiable Secret Sharing" Proceedings of the 28th IEEE Symposium on Foundations of Computer Science (pp. 427–437) 1987.

Desmedt, Y. et al., "Shared Generation of Authenticators and Signatures", Crypto '91, Lecture Notes in Computer Science pp. 457–469, Springer–Verlag 1992 (J. Feigenbaum Ed.).

(1) Yvo Desmedt and Yair Frankel, Shared generation of authenticators and signatures (Extended Abstract), EE & CS Department, University of Wisconsin–Milwaukee, Milwaukee, WI 53202 pp. 457–469, at desmedt@cs.uwm.edu/ yair@cs.uwm.edu.

(2) Yair Frankel et al., Non–existence of homomorphic general sharing schemes for some key spaces, (Extended Abstract), EE & CS Department, University of Wisconsin–Milwaukee, Milwaukee; WI 53202, pp. 549–557, at yair@cs.uwm.edu.

(List continued on next page.)

*Primary Examiner*—Pinchus M. Laufer
*Attorney, Agent, or Firm*—Steptoe & Johnson LLP

[57] ABSTRACT

Proactive robust threshold schemes are presented for general "homomorphic-type" public key systems, as well as optimized systems for the RSA function. Proactive security employs dynamic memory refreshing and enables us to tolerate a "mobile adversary" that dynamically corrupts the components of the systems (perhaps all of them) as long as the number of corruptions (faults) is bounded within a time period. The systems are optimal-resilience. Namely they withstand any corruption of minority of servers at any time-period by an active (malicious) adversary (i.e., any subset less than half. Also disclosed are general optimal-resilience public key systems which are "robust threshold" schemes (against stationary adversary), and are extended to "proactive" systems (against the mobile one). The added advantage of proactivization in practical situations is the fact that, in a long-lived threshold system, an adversary has a long time (e.g., years) to break into any t out of the l servers. In contrast, the adversary in a proactive systems has only a short period of time (e.g., a week) to break into any t servers. The model of mobile adversary seems to be crucial to such "long-lived" systems that are expected to span the secure network and electronic commerce infrastructure.

71 Claims, 11 Drawing Sheets

OTHER PUBLICATIONS (3) Yair Frankel et al, On the risk of disruption in several multiparty signature schemes, (Extended Abstract), EE & CS Department, University of Wisconsin–Milwaukee, Milwaukee, WI 53202 pp. 1–10, May 5, 1996.

(4) Markus Michels et al. GOST 34.10 A Brief Overview of Russia's DSA, Theoretical Computer Science and Information Security, University of Technology Chemnitz, D–09111, Chemnitz, Germany, pp. 1–4, Aug. 21, 1995 at {mmi,hpe}@compuserve.com.

(5) Kaisa Nyberg and Rainer A. Rueppel, Message Recovery for Signature Schemes Based on the Discrete Logarithm Problem, Prinz Eugen–Strasse 18/6, A–1040 Vienna, Austria, pp. 1–15, Jul. 21, 1994.

(6) Susan K. Langford, Weaknesses in Some Threshold Cryptosystems, Atalla Corporation, 2304 Zanker Road, San Jose, CA 95131, e–mail: langford_susan@tandem,com, pp. 1–9.

(7) L. Harn, Group–oriented (t,n) threshold digital signature scheme and digital multisignature, IEE, Tech. vol. 141 No. 3, Sep. 1994.

(8) Bob Blakley et al., Threshold Schemes With Disenrollment, Entry Systems Division, IBM Corporation, Austin TX 78758, pp. 541–548.

(9) G.R. Blakley and G.A. Kabatianski, On General Perfect Secret Sharing Schemes, Department of Mathematics, Texas A&M University, USA, e–mail blakeley@math.tamu.edu. pp. 367–371.

(10) Cryptography and coding, edited by Henry J. Beker and F.C. Piper, Clarendon Press, Oxford, 1989, Article of R.A. Croft and S.P. Harris, Public–Key Cryptography and Re–Usable Shared Secrets, pp. 189–201.

(11) Torben Pryds Pedersen; A threshold Cryptosystem Without a Trusted Party, Aarhus University, Computer Science Department, Ny Munkegade, DK–8000, Arhus C, Denmark, pp. 522–526.

(12) Yvo G. Desmedt, Threshold Cryptography, EE & CS Department, University of Wisconsin, Milwaukee, WI 53201–0784, USA, pp. 35/449–43/457, ETT, vol. 5 No. 4, Jul.–Aug. 1994.

(13) Yair Frankel, A Practical protocol for Large Greoup Oriented Networks, Electrical Engineering and Computer Science Department, University of Wisconsin–Milwaukee, Milwaukee, WI 53201, pp. 56–61.

(14) Cryptography and coding edited by Henry J. Becker and F.C. Piper, Claredon Press, Oxford, 1989, Article of C. Boyd, Digital Multisignatures, pp. 241–246.

(15) Chin–Chen Chang and Horng–Chin Lee, A New Generalized Group–Oriented Cryptoscheme Without Trusted Centers, IEEE Journal on Selected Areas in Communications, vol. 11, No. 5, pp. 725–729, Jun. 1993.

(16) Chuan–Ming Li et al., Remark on the Threshold RSA Signature Scheme, Institute of Information Engineering, National Cheng–Kung University, Tainan, Taiwan, R.O.C., pp. 413–419.

(17) Torben Pryds Pedersen, Distributed Provers with Applications to Undeniable Signatures, Aarhus University, Computer Science Department, Ny Munkegade, DK–8000, Arhus C, Denmark, pp. 221–242.

(18) Michael K. Reiter and Kenneth P. Birman, How To Securely Replicate Services, AT&T Bell Laboratories, Room 4F–637, 101 Crawfords Corner Road, Holmdel, NJ 07733, e–mail: reiter@research,att.com, pp. 986–1009, ACM Transactions on Programming Language and Systems, vol. 16 No. 3, May 1994.

(19) Yvo G. Desmedt and Yair Frankel, Homomorphic Zero–Knowledge threshold Schemes Over Any Finite Abelian Group, Siam J. Disc. Math, vol. 7, No. 4, pp. 667–679, Nov. 1994.

6,035,041

OPTIMAL-RESILIENCE, PROACTIVE, PUBLIC-KEY CRYPTOGRAPHIC SYSTEM AND METHOD

FIELD OF THE INVENTION

The invention relates to the field of electronic cryptographic systems and methods. More particularly, the invention relates to systems and methods for distributing a cryptographic service (e.g., electronic document signing) among a plurality of servers in a communication or data processing network.

BACKGROUND OF THE INVENTION

Certain attempts at distributed cryptographic operation, such as signing and encrypting/decrypting, are known. However, no previous system enjoys efficiency of operation combined with high level of security and availability in a system that retains its security while any minority of distributed servers collude and stop, misbehave, and try to help in breaking the system's secret. Other attempts have been made to deal with various issues of threshold cryptography and mobile adversaries, although only a limited number discuss proactive function sharing.

The notion of "proactive public-key" was addressed in A. Herzberg, S. Jarecki, H. Krawczyk, and M. Yung in: *Proactive Secret Sharing, or: How to Cope with Perpetual Leakage,* Advances in Cryptology—Crypto 95 Proceedings, Lecture Notes in Computer Science, Vol. 963, D. Coppersmith ed., Springer-Verlag, 1995, pp. 339–352 ("[HJKY]"). This implementation was based on "discrete logarithm" with exponentiation in a prime field (i.e., given the elements modulo a prime p, use a generator of GF(q) where q divides p-1). This problem involves distributed computation over keys, and the keys in this case are taken from domains whose algebraic structure is public (a group of a known order).

A number of other theoretic references to making cryptographic mechanisms proactive include: R. Ostrovsky and M. Yung, *How to Withstand Mobile Virus Attacks,* Proc. of the 10th ACM Symposium on the Principles in Distributed Computing, 1991, pp. 51–61 ("[OY]"); R. Cannetti and A. Herzberg, *On Maintaining Security in the Presence of Transient Faults,* Advances in Cryptology, Proc. of Crypto '94 ("[CH]"); A. Herzberg, M. Jakobsson, S. Jarecki, H. Krawczyk, and M. Yung, *Proactive Public Key and Signature Systems,* The 4-th ACM Symp. on Comp. and Comm. Security, April 1997 ("[HJJKY]"); Y. Frankel, P. Gemmel, P. MacKenzie and M. Yung, *Proactive RSA,* Tech Report Version SAND96-0856, Sandia National Laboratories, March 1996 ("[FGMY]"). Each of the references cited above, and all other references cited below, are fully incorporated herein by reference.

SUMMARY OF THE INVENTION

The invention offers a general implementation of distributed cryptographic functions combined with a high level of availability of service, high efficiency of operation, and a high level of security. It is applicable to a variety of asymmetric-key cryptographic functions, such as digital signatures, encryption, escrow, authorization, etc.

An object of the invention is to provide a cryptographic system and service that is distributed and optimal in tolerance of faulty distributed components.

A further object is to provide an asymmetric-key cryptographic system and service employing a plurality of servers such that the system is available and remains secure as long as, within a time-period, some majority of the servers acts correctly.

A further object is to provide an asymmetric-key cryptographic system and service having a set of protocols for distributing a cryptographic function.

A further object is to provide an asymmetric-key cryptographic system and service capable renewing and recovering key shares.

A further object is to provide an asymmetric-key cryptographic system and service having optimal resilience.

A further object is to provide a robust cryptographic system.

These and other objects are achieved by providing a distributed cryptographic system and service including periodic reexpression of the basic cryptographic function. The reexpression may be to a different family of functions than the basic cryptographic function. Reexpression may utilize a "share of shares" method (e.g., "poly-to-sum" or "sum-to-poly"). These methods allow for proactivization, and for changing the threshold parameter from t-out-of-l to t-out-of-t and vice versa. The methods further provide for changing t and l dynamically as a system management tool. Additional aspects of the invention provide for checking protocols to monitor individual servers of the distributed cryptographic system, thereby making the system robust.

Techniques of the present invention can be applied to any system implementing a cryptographic function where: 1) the function has the property of share translation (i.e., $f_{k_1}(m) * f_{k_2}(m) = f_{k_1+k_2}(m)$); 2) one can compute inverses in the share space; and 3) the share space is simulatable (i.e., one can chose random elements in a simulatable space which is indistinguishable from choosing in the key space).

DESCRIPTION OF THE PREFERRED EMBODIMENTS

Figure 1:
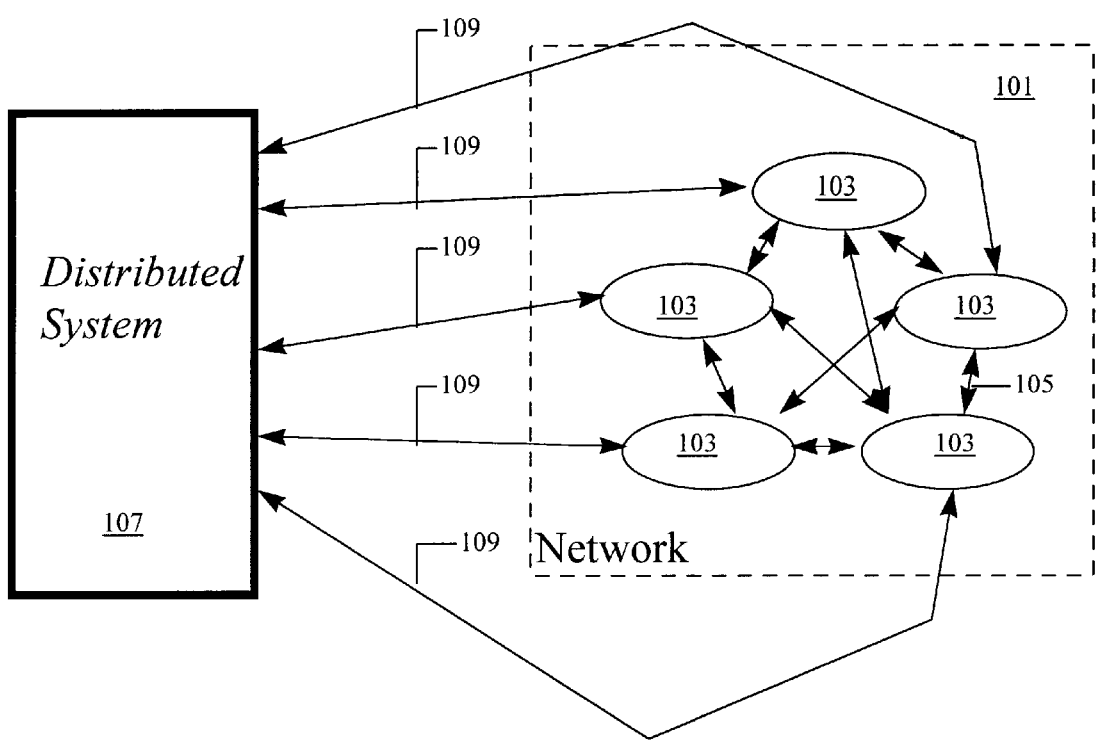
FIG. 1 illustrates a network environment that has available to it a distributed cryptographic service function or functions and that is suitable for embodying the present invention.

Threshold cryptography in general, and function sharing for public-key functions in particular, has the spirit of secret sharing, where a secret is shared and is recoverable only from a threshold of shareholders. Function sharing provides for the availability of a keyed cryptographic function $f_K(\bullet)$ by distributing $f_K(\bullet)$ to a set of l servers such that, for any valid argument m, any set of at least a threshold of t out of the l servers can compute $f_K(m)$. This increases the availability of function evaluation (typically a signature or a decryption function). For security, an adversary who (1) controls less than a threshold of servers and (2) can hear all public messages obtains no computational advantage in computing $f_K(m')$ for a target message m' (as compared to an adversary attacking the centralized function $f_K(\bullet)$ with the same capabilities). Thus the function is protected by "space diffusion," because an attacker is forced to break the memory of more than a threshold t of the function shareholders.

"Resilience" is a property describing the number of allowed compromised and misbehaving servers in a time period, which is a parameter here called t. An optimal t ("optimal resilience") means that the total number of servers is $1 \geq 2(t-1)+1$. For this t, a majority of arbitrarily misbehaving servers can "control" the computation (even for a stationary adversary).

The notion of "proactive security" (against a mobile adversary) provides enhanced protection of memories of long-lived cryptographic keys that may be distributed (i.e., protected by "space diffusion"). Proactive security adds protection by "time diffusion" as well. Namely, given a distributed function via threshold cryptography (function sharing) as described above, it adds a periodic refreshing of the contents of the distributed servers' memories. This refreshing is a "t-wise re-randomization" of the local servers' values in a way that preserves the global key, but makes previous contents of any set of less than t out of the l servers "useless". This renders useless the knowledge of the mobile adversary (e.g., hackers, viruses, bad administrators, etc.) obtained in the past from compromising less than the allowed t servers, and gives the system a self-securing nature.

The proactive systems for cryptographic functions inherit the availability of function-sharing by allowing any subset of servers of size t to compute the underlying function, thereby preventing a small set of faulty servers from disrupting availability. Proactive systems also can use robustness-techniques to enhance availability of threshold cryptosystems by tolerating (detecting or correcting) malicious servers who are actively attacking the availability of the system. Moreover, proactive security enhances robustness, because it also provides for recovery of servers' memories that were previously corrupted by an adversary or by non-malicious faults. This gives the system a self-healing nature.

As a result, the system can tolerate a "mobile adversary" which is allowed to potentially move among servers over time, with the limitation that it can only control up to t–1 servers during a particular time interval. The adversary may even eventually visit the entire system (under the above restriction). Nevertheless, the system self-heals from erasures and corruption of memories by the adversary, and self-secures against the adversary's actions. This is a stronger adversary than a stationary one (which corrupts servers in a monotone fashion).

FIG. 1 illustrates a network environment that has available to it a cryptographic service function or functions and that is suitable for embodying the present invention. The network 101 includes multiple nodes 103 interconnected by communications paths 105. A distributed system 107 also connects to the network 101 through communication paths 109. It will be appreciated that many configurations of nodes 103 and connection paths 109 would be suitable.

Figure 2:
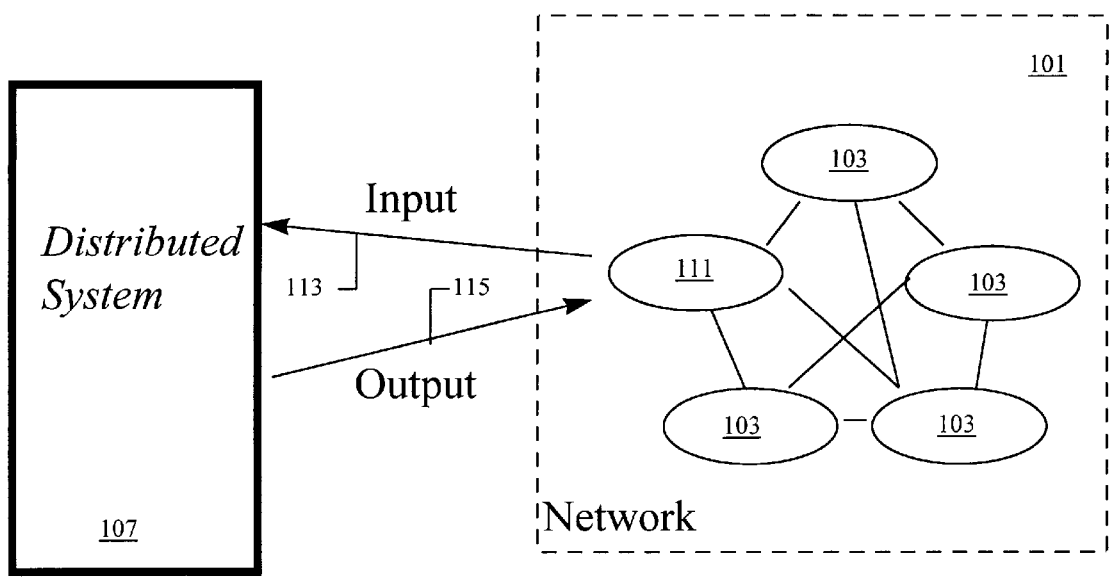
FIG. 2 illustrates an exemplary request by a requesting node to the distributed system for a cryptographic service.

FIG. 2 illustrates an exemplary request by a requesting node 111 to the distributed system 107 for a cryptographic service. As illustrated, a single requesting node 111 provides an input communication 113 to the distributed system 107. The distributed system 107 performs the cryptographic service, and returns an output communication 115. It will be appreciated that many variations in the manner of presentation of a request and return of a result would be suitable. For example, it is not required that a single requesting node 111 present a complete request in a single input communication 113, or that the output be returned to the requesting node 111 in a single output communication 115. Many protocols would be suitable, and could include a variety of administrative interactions, such as verification by the distributed system 107 of the identity of the requesting node 111, confirmation of payment for the service, etc.

Figure 3:
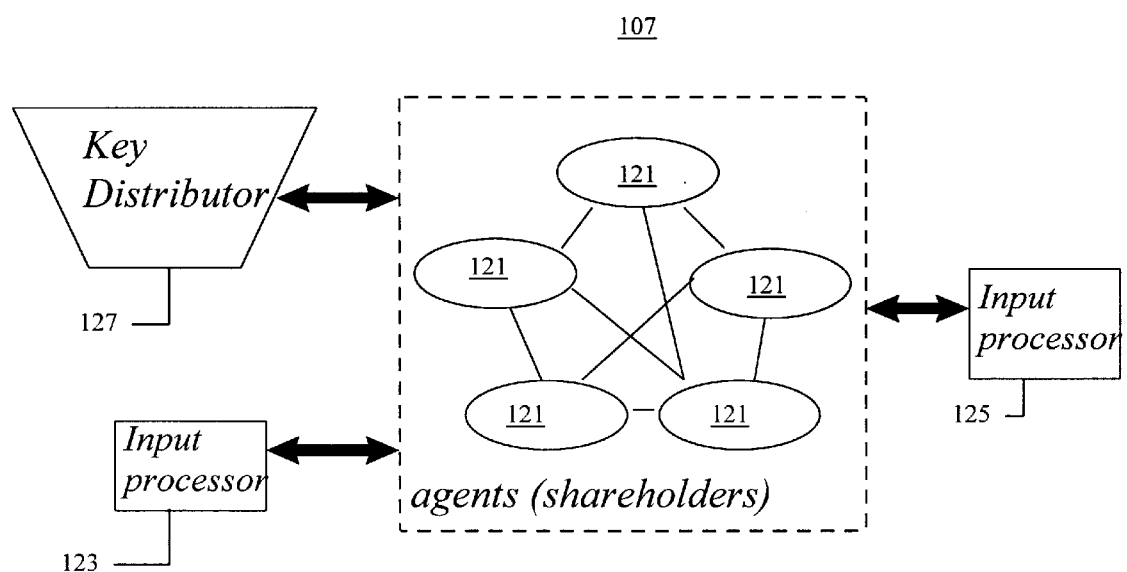
FIG. 3 illustrates an exemplary distributed system for performing a cryptographic service.

FIG. 3 illustrates an exemplary distributed system 107 for performing a cryptographic service. Multiple agents 121 each participate in performing the cryptographic service in a distributed manner. For simplicity of illustration, all agents are given the same reference numeral, even though each might perform different functions in the course of providing a cryptographic service as discussed more fully below. An input processor 123 receives an input communications 113 from a requesting network entity (not shown), and provides all of the agents 121 with information relating to the particular cryptographic service request. An output processor 125 receives and combines partial-result information from each of the agents 121, and provides an output communication 115 to the requesting network entity (not shown). The input processor 123 and output processor 125 can provide a layer of security as a so-called "firewall" between the network (not shown) and the agents 121, and can further assume additional administrative tasks.

Many cryptographic services involve the application of an asymmetric cryptographic key to input information. For example, if the cryptographic service is digital signing of electronic documents, the distributed system would generate a single signature for the document on behalf of the distributed system as a whole. In a public key cryptosystem, such a signature would correspond to the application of a secret signature key to a message. A signature recipient could verify the signature by using a public verification key that corresponds to the secret signature key.

In the distributed system 107, the secret signature key does not exist as a single key in a single location. Instead, a key distributor (sometimes called a "dealer") 127 distributes key shares to each of the agents 121. Each agent 121 applies its individual key share to an input, and the collective operation of multiple agents 121 would produce a single signature that can be verified by a single public verification key. However, no single agent possesses sufficient information to generate the signature by itself. Agents can also be referred to as "shareholders," in the sense that each agent holds a share of the key.

For the purpose of the illustration of FIG. 3, heavy lines with arrows at both ends designate a plurality of communication paths to all agents. Light lines without arrows designate individual communication lines among agents. Each agent 121 can communicate with every other agent 121, with the key distributor 127, with the input processor 123, and with the output processor 125. It is preferred that no agent 121 be accessible to the network (not shown), except through the input processor 123 and output processor 125.

It will be appreciated that the methods of the present invention will be practicable in a variety of alternate configurations. For example, a single computer server could function both as an input processor 123 and an output processor 125. It is also possible (though not preferred) for a designated one or ones of the agents 121 to act as an input processor, or an output processor, or both. It is possible (though not preferred) for one of the agents to perform the key distribution function, rather than to rely on a separate key distributor 127. Alternatively, the agents might generate key shares in a distributed manner, in which case the key distributor 127 or one or more of the agents 121 could serve as an administrative coordinator for the key distribution process.

Figure 4:
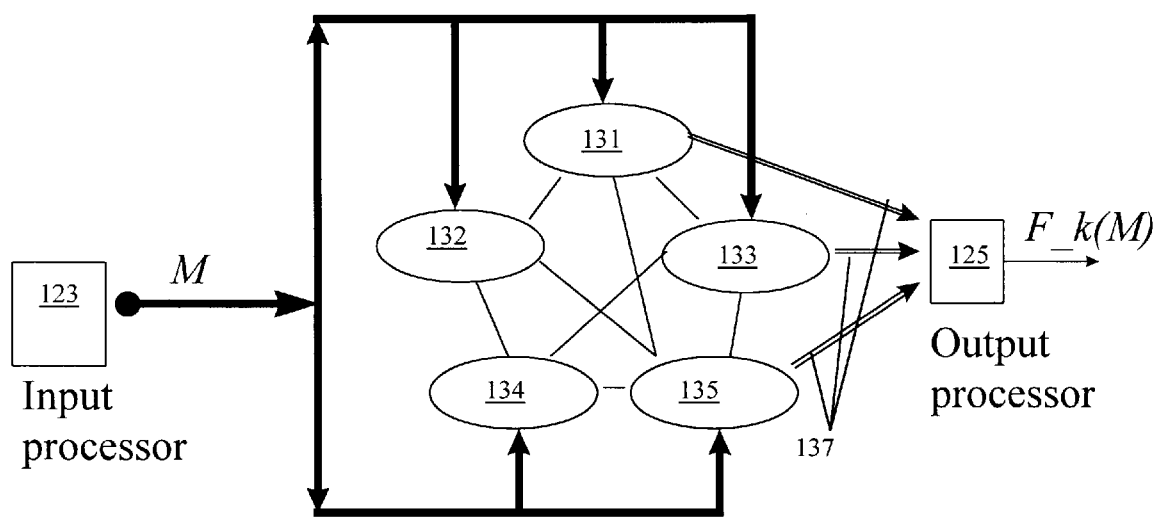
FIG. 4 illustrates generic communications within a distributed system for embodying present invention.

As will be discussed more fully below, the distributed system 107 can provide a cryptographic service using fewer than all agents 121. FIG. 4 illustrates generic communications within the distributed system 107 when three agents 131, 133 and 135 participate in providing the service. Two other agents 132, 134 do not actively participate in generating the output. In this illustration, the input processor 123 provides a message M to all five agents 131, 132, 133, 134, 135. Two of the five agents 132, 134 take no action, either because of an instruction from the input processor 123, or by some other signaling means. For example, the message itself could designate, or be associated with a header that designates, which particular ones of the agents are to participate in the service. Depending on the protocol used, as many as all of the processor can act, though only a subset are used for the final computation. The three active agents 131, 133, 135 each apply their respective key shares to generate partial results 137. The output processor 125 receives the partial results 137 and combines them into an output $F_k(M)$, which in turn is communicated to the requesting node of the network (not shown).

Figure 5:
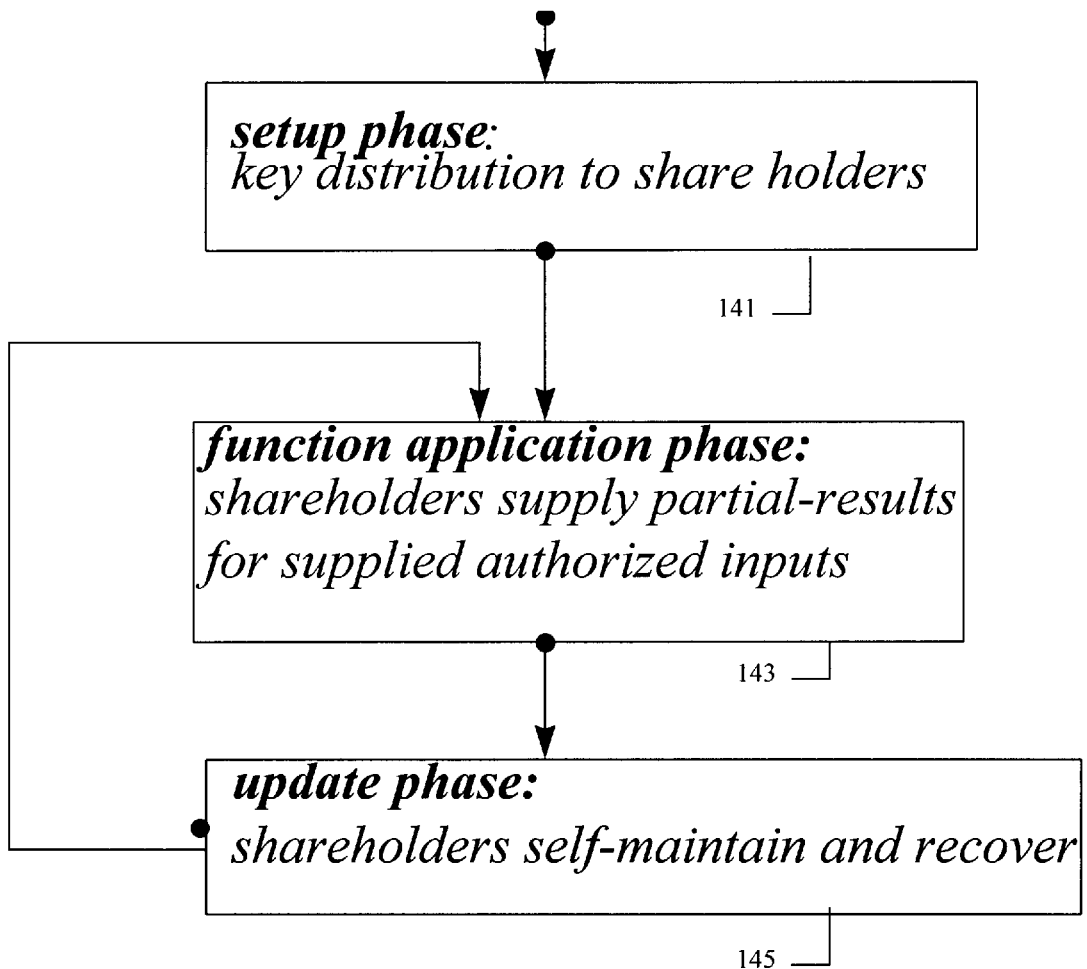
FIG. 5 illustrates general phases of operation of a distributed system embodying the present invention.

FIG. 5 illustrates general phases of operation of the distributed system. In a setup phase 141, the key distributor distributes key shares to agents of the distributed system. In a function application phase 143, agents apply their respective key shares to inputs, and provide partial results to the output processor. In an update phase 145, members of the distributed system periodically take a variety of actions to maintain system security and to recover from passive failures and/or active attempts to corrupt the system. After the update phase 145, the distributed system returns to providing cryptographic services in the function application phase 143.

Poly and Sums

A secret or a function may be shared via a system of mathematical equations, so as to enable subsets of users or a quorum of users to be able to apply their shares to get partial results that are then combined and computed upon to produce the final result. The final result on the given input is equal to the final result of the function which is re-expressed by the shares. The discussion below will concentrate on one representation of functions that are re-expressed as distributed shares, which are points on a polynomial (which we call sharing by "poly"). Other approaches are possible as in the use of finite geometry with hyperplanes.

A secret or a function may be shared so that all shares are needed and all shares are applied to get partial results that are then combined. We concentrate on combining through addition, and therefore call this sharing: sharing by "sum."

A Secure Robust Threshold RSA

Described below is a threshold RSA scheme suitable for use in a distributed system as described above, but for which the security is not known. Then, the threshold scheme will be modified to be an RSA threshold scheme which is as secure as RSA under the stationary (non-mobile) adversary model. The basic idea of this example is to use the Shamir threshold scheme where inverse computations are easy. Hereinafter, let L=l!, where l is the size of the set of servers.

A Heuristic Threshold RSA Scheme

RSA is generated by the dealer with a public key (e,n) and a private key d. Let H=gcd(e,L) and using the extended Euclidean algorithm compute P,s' such that $$1 = eP + \frac{L^2}{H^2}s'.$$

Note that $d \equiv P + L^2 k' \mod \theta(n)$ where $k' \equiv ds'H^{-2} \mod \theta(n)$. This is computable since $H^{-1}$ exists thus e must be invertible. A random polynomial r(x) of degree t−1 with coefficients in $\{0, L, \ldots, L^3 tc\}$, where c is poly(n), is chosen such that $r(l+1) = L^* k' \epsilon Z$. (The t factor in the coefficients is used for the proactive scheme and can be set to 1 for the static threshold RSA without proactivization.) Let P be made public (i.e., part of each shareholder's key). Next, shareholder i with public interpolation points $x_i = i$ receives secretly share $s_i = r(x_i) \epsilon Z$. Note, that the share is a multiple of L. Now, let Λ where |Λ|=t be any subset of shareholders, observe:

$$d = P + \sum_{i \in \Lambda} s_i \cdot z_{i,\Lambda} \in Z \text{ where} \tag{1}$$

$$z_{i,\Lambda} = \prod_{v \in \Lambda \setminus \{i\}} (x_i - x_v)^{-1}(l + 1 - x_v)$$

Since L divides $s_i$ and $$\prod_{v \in \Lambda \setminus \{i\}} (x_i - x_v)$$

is a multiple of L, the terms in the above sum can be computed effectively over the integers from $s_i$ (without inverses in the group). Hence to generate a signature for message m, each iεΛ gives partial results $m^{s_i \cdot z_{i,\Lambda}} \mod n$, and a combining function computes $m^P \mod n$ and the final desired result:

$$m^d \equiv m^P \cdot \prod_{i \in \Lambda} m^{s_i \cdot z_{i,\Lambda}} \mod n.$$

The above scheme is arithmetic-wise analogous to the systems in Y. Desmedt and Y. Frankel, shared *Generation of Authenticators and Signatures,* Advances in Cryptology—Crypto 89 Proceedings, Lecture Notes in Computer Science, Vol. 435, G. Brassard ed., Springer Verlag, 1989, pp. 307–315 ("[DF91]") (which was designed for strong primes), the analogy is by distributing shares as $s_i/L$ using interpolation point l+1 rather than 0 as the secret location and therefore choosing $Z_{i,\Lambda}$ slightly different.

Shares of Shares (Poly-to-Sum)

Now is discussed a t-out-of-t share (poly-to-sum) protocol. This is a protocol among t servers which transforms a t-out-of-l polynomial based sharing scheme to a t-out-of-t additive sharing scheme. It extends the scheme in [FGMY] which transforms a t-out-of-t sharing by sum to another f-out-of-t sharing by sum. This poly-to-sum protocol provides for randomization of the current state which converts the above (or [DF91]) to a secure system as discussed below in the section entitled "A Secure Threshold RSA Scheme." This randomization is also designed specifically to allow for robustness in the section below entitled "Robust Threshold RSA Scheme."

Figure 6:
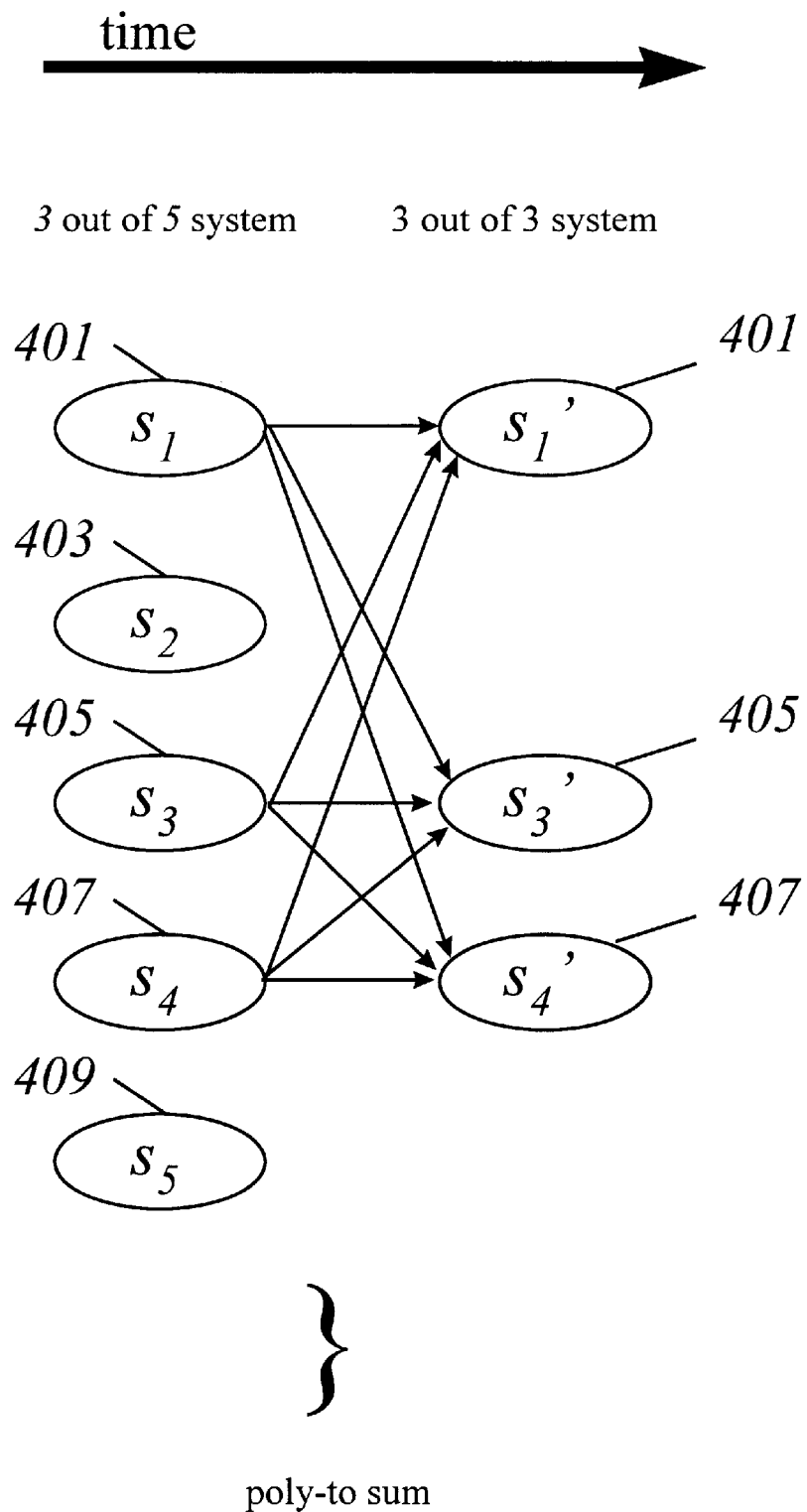
FIG. 6 illustrates a system of communicating servers.

FIG. 6 illustrates a system of communicating servers 401, 403, 405, 407 and 409 which perform poly-to-sum for a 3-out-of-5 sharing of the secret RSA key configuration. The secret RSA key is distributed using, for instance as in [DF91], a polynomial approach to sharing in which server 401 has shares$_1$, server 403 has share s$_2$, server 405 has share s$_3$, server 407 has share s$_4$, and server 409 has share s$_5$. The poly-to-sum protocol enables any 3 of the servers to convert their respective shares for a 3-out-of-1 system into a 3-out-of-3 system. As denoted over time after the poly-to-sum protocol is performed, server 401 with share s$_1$ obtains share s$_1$', server 405 with share s$_3$ obtains share s$_3$', and server 407 with share s$_4$ obtains share s$_4$'. The new shares s$_1$', s$_3$', s$_4$' are obtained from a distributed protocol amongst the servers in the 3-out-of-3 reconfiguration. The arrows in FIG. 6, denote that relationship of the new shares to the old shares. For example, server 401 obtains share s$_1$' by a protocol whose result has a relationship to s$_1$, s$_{33}$, and s$_4$, as depicted in FIG. 6.

Figure 7:
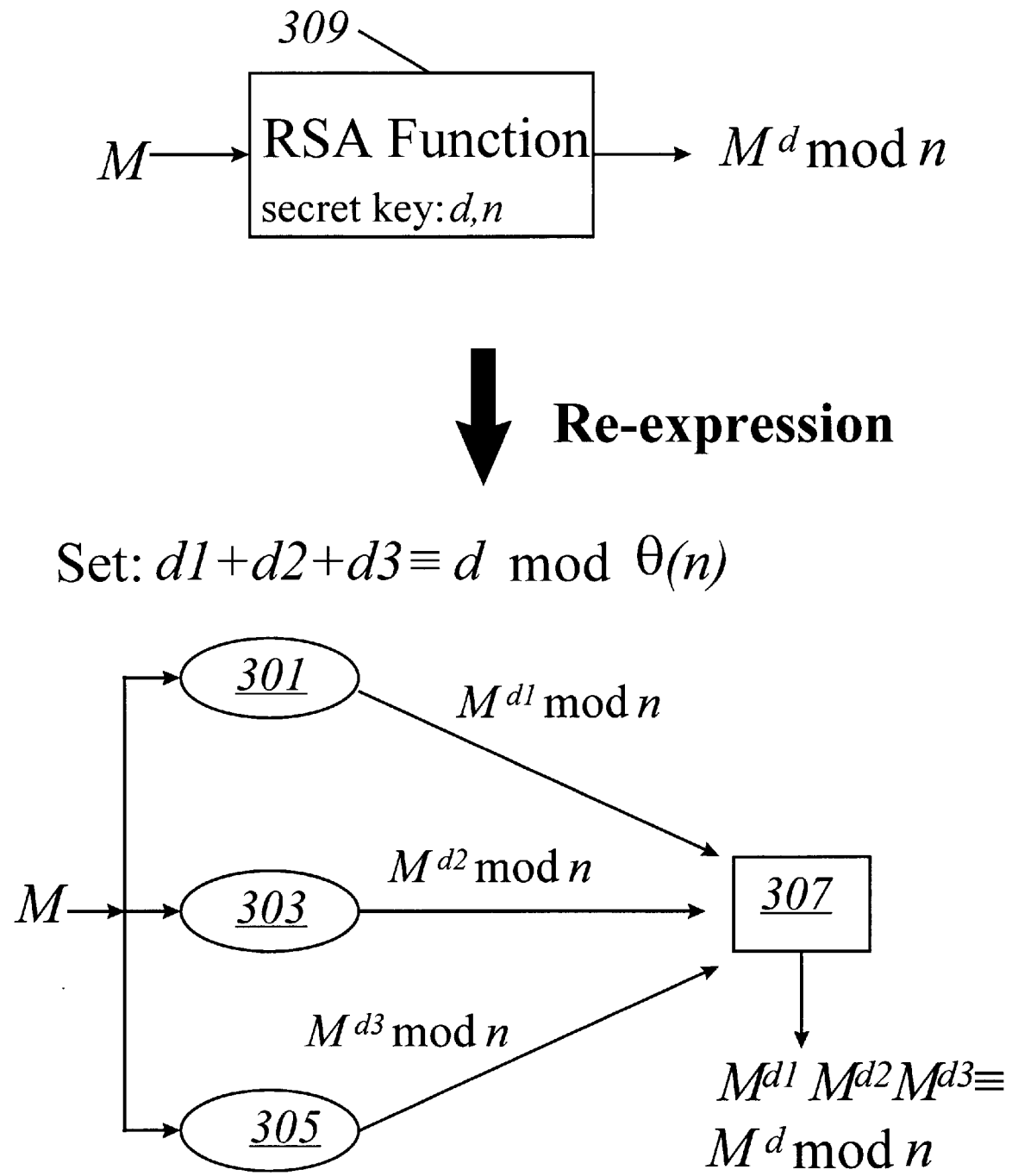
FIG. 7 illustrates the reexpression of an RSA function.

FIG. 7 illustrates the reexpression of an RSA function. The 3-out-of-3 system configuration with servers 301, 303 and 305 depicts an additive three-out-of-three sharing which can be performed after the poly-to-sum protocol is performed. That is, the keyed RSA function 309 is re-expressed into a protocol in which servers 301, 303, 305 working with server 307 can compute the same function evaluation of the keyed RSA as in 309. Let d1+d2+d3≡d modθ(n), let server d1, let server 303 have share d2 and let server 305 have share d3. As depicted, each of the servers 301, 303 and 305 can compute $M^d$ mod n using their respective share, the input M, and the public composite n when working with 307. It is possible to allow server 307 to be server 301, 303 and/or 305.

To relate servers 401, 405 and 407 (FIG. 6) to servers 301, 303 and 305 (FIG. 7), after the poly-to-sum protocol, the configuration could be: server 401 depicted as server 301; server 405 depicted as server 303; and server 407 depicted as 305. Moreover, share s$_1$' is replaced by d1, share s$_2$' is replaced by d2, and share s$_3$' is replaced by d3 in FIG. 7. System implementation can be as follows.

Setup: We assume that the dealer, during share distribution, publishes elements g, $g_1 \in Z_n^*$ of maximal order, and it publishes $S_i = g^{s_i \cdot L^2}$ mod n for all i. Let Λ where |Λ|=t be the shareholders (servers) participating in the share of shares protocol. Servers choose a lead server i'.

Sharing shares: Server i:

Generates: $r_{i,j} \in_R \{0,1, \ldots, n-1\}$ for $j \in \Lambda \setminus \{i\}$.

Set self-held share to be: $r_{i,j} = s_i \cdot z_{i,\Lambda} - \Sigma_{j \in \Lambda \setminus \{i\}} r_{i,j} \in Z$.

Privately transmit over the public channel using probabilistic encryption (an act which also publicly commits to the message) $r_{i,j} \in Z$ and $r'_{i,j} \in_R \{0, \ldots, n-1\}$ to server j.

Publish $R_{i,j} \equiv g^{r_{i,j} L^2} g_1^{r'_{i,j}}$, and $U_i \equiv \Pi_{j \in \Lambda} g_1^{r'_{i,j}}$.

Verify and generate shares: Let $r_{i,j,0}$ and $r'_{i,j,0}$ be the commitment values that j received privately from i. This verifies that one received the correct committed values, shares are of correct size, and algebraic relations between various committed values show correctness of interaction.

1. Each server j verifies that for all $i \in \Lambda \setminus \{j\}$:

$(S_i)^{V_1} \stackrel{?}{\equiv} (U_i^{-1} \Pi_{v \in \Lambda} R_{i,v})^{V_2}$ where: $V_1 = \Pi_{v \in \Lambda \setminus \{i\}}(l+1-x_v)$ and $V_2 = \Pi_{v \in \Lambda \setminus \{i\}}(x_i - x_v)$.

If the verification does not pass, then server i is removed and new Λ is chosen.

$|r_{i,j,0}|^2 \leq n-1$, and $g^{r_{i,j,0} \cdot L_2} g_1^{r_{i,j,0}'} \equiv R_{i,j}$ If verifications are disputed by j then $r_{i,j,0}$ and $r_{i,j,0}'$ is revealed (decommited), and either i or j is removed appropriately. The protocol is halted.

The first verification (on the magnitude of $r_{i,j,0}$) is used to prevent an attack in which the adversary sends very large values so that the shareholder cannot compute efficiently. Different techniques can be used such as the size of packets (fields) which transmit $r_{i,j,0}$ may be of a fixed size but large enough.

2. If all verifications pass, shareholder's $j \in \Lambda$ new share is $s'_j = -r''_j + \Sigma_{i \in \Lambda} r_{i,j,0}$ such that $L^2$ divides $s'_j$ and $0 \leq r''_j < L^2$.

3. Shareholder j publishes $r''_j$ and $Q_j = \Pi_{v \in \Lambda} g_1^{r'_{v,j,0}}$.

Note that any attempt to spoil the computations forces an adversarial server to be removed. When the protocol is used in an environment where $1 \geq 2(t-1)+1$ servers, we can revise the set Λ to a new set of t shareholders and redo with the set of shareholders from start.

Remark: splitting the shares in step 2 above is not necessary at this point, but will be used in the proactive extension discussed below.

A SECURE THRESHOLD RSA SCHEME

Discussed here is a secure threshold RSA protocol. It is not known how to prove the security of the hueristic RSA thresold cryptosystem in the static adversary model. The problem is proving security when the subsets of signers change from message to message—which makes its security only a heuristic. To get a provably secure protocol, the approach is to dynamically convert the signing shares of the current set of t shareholders employing the poly-to-sum technique above. Then the signing is done using the shares of the sum. "Dynamically converting" here means that any new set of t shareholders have to go through the above poly-to-sum technique prior to signing. This will make partial views available to the adversary random and independent, and will permit one to "simulate" the adversary's view. By demonstrating that one can simulate the view, one can give a proof of security as follows.

Step 0 (Setup): The share distribution protocol of the section titled, "A Heuristic Threshold RSA Scheme" is performed, and encryption keys for each server are distributed. It is assumed that the dealer during setup publishes elements $g, g_1 \in Z_n^*$ of maximal order where $g_1 = g^a$ for a relatively prime to θ(n), (the elements can be part of each server's key). $S_i = g^{s_i \cdot L^2}$ mod n for all i is made public as well.

Step 1 (Poly-to-sum): Perform the poly-to-sum (share-of-shares) protocol of the section above entitled "Share of Shares (Poly-to-sum)" ("Poly-to-sum") until a set of t servers which successfully complete the poly-to-sum protocol without disputes is found. Let Λ be the t servers which successfully completed the protocol.

Step 2 (Signing): To sign for each input message m, each server in Λ broadcasts partial result $S_{m,i,\Lambda} = m^{s'_i}$ mod n where $s'_i$ is from "Poly-to-sum." Observe that $m^d \equiv m^{P+w \cdot \Pi_{i \in \Lambda} S_{m,i,\Lambda}}$ mod n, where $W = \Pi_{i \in \Lambda} r''_i$, which can be easily computed by the publicly available combining function. Shareholders in Λ can now sign as many messages as they desire using the s'shares they obtained in the poly-to-sum protocol without performing the poly-to-sum conversion again. As a performance optimization note that a server can keep in its cache polynomially many shares for different Λ's.

EMPLOYING A CHECKING PROTOCOL TO ASSURE ROBUSTNESS IN THE RESILIENT DISTRIBUTED CRYPTOGRAPHIC FUNCTION SERVER.

In the distributed cryptographic service, we may want to assure integrity of the partial results. To this end, the units may engage in a checking protocol between a unit and the output process. As a result of this protocol the output process can decide which partial result is correct and which to discard, i.e. it performs an error-detection and elimination process. Given the remaining correct partial results, the output process can combine and compute the final result.

As an alternative to error detection and elimination, the output process may apply an error correction procedure that computes with correct and incorrect pieces, but as long as there is a quorum of correct partial results, the final result is correct. This assures that the robustness is maintained even in a system where some components may fail (hardware or software failures). Note that input and output processes need to be replicated in high availability system in an environment where components may fail.

Figure 8:
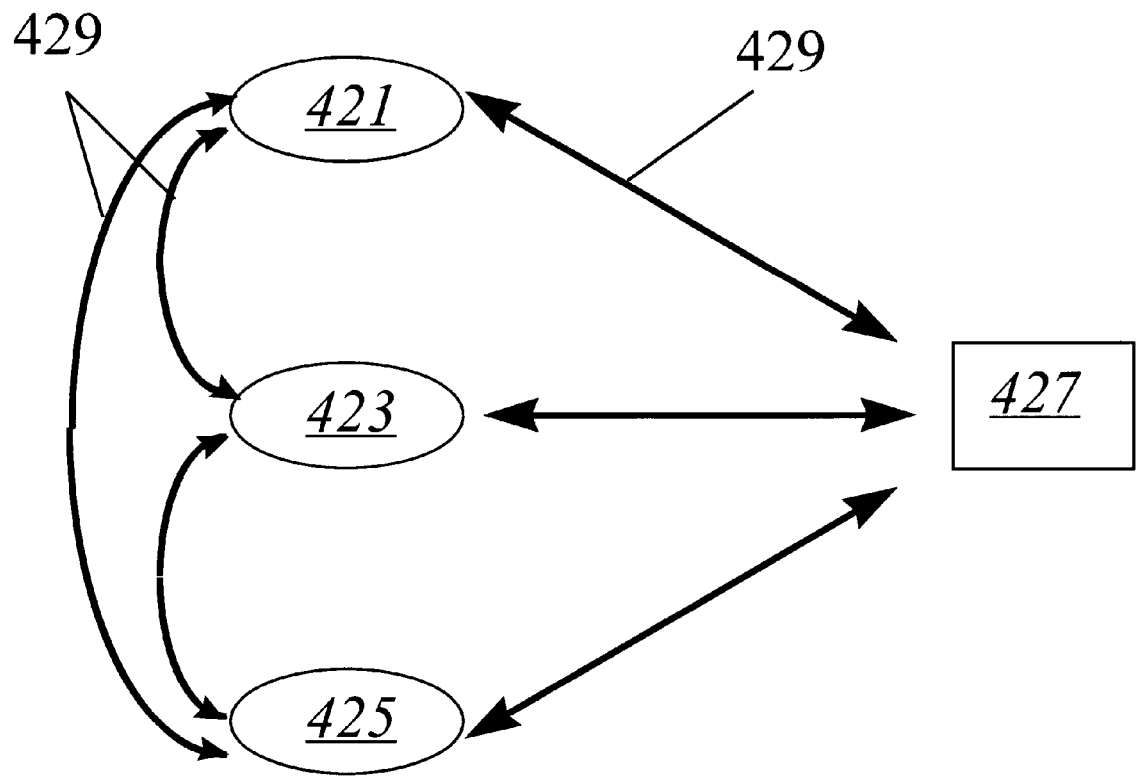
FIG. 8 illustrates a checking protocol for a robust cryptographic system.

FIG. 8 illustrates a checking protocol for a robust cryptographic system. As depicted in the 3-out-of-3 configuration, the three servers 421, 423, and 425 in combination with the combining function 427 are performing a protocol. (The combining function 427 may be shared in another server, such as 421, 423, 425 and/or other servers.) The verification protocol for 421's partial result is performed via the interactions 421 has with 423, 425 and 427 as depicted by 429. An exemplary verification for an RSA scheme is discussed below.

ROBUST THRESHOLD RSA SCHEME

The scheme described above in the section titled, "A Secure Threshold RSA Scheme," is secure but it is not robust. A subset of size t may include a misbehaving party during signing, and a new subset will have to be considered. Robustness provides for efficient verification of a shareholder's computation. The secure threshold RSA protocol can be made robust as discussed below.

Setup: Let Verifier be the entity that computes the efficient combining function to obtain $m^d$ mod n from the output of the shareholders. Let $s'_i$ be server its share generated from the share of share protocol in the section above titled, "Shares of Shares (Poly-to-Sum)," and let witness $S'_{i^*} \equiv g^{s'_i \cdot L2} \equiv ((\Pi_{v \in \Lambda} R_{v,i})./(Q_i g^{r^*_i \cdot L^2}))$ mod n be generated using public information provided in "Shares of Shares (Poly-to-sum)."

Verify partial result: One can use a technique from Y. Frankel, P. Gemmel and M. Yung, "*Witness Based Cryptographic Program Checking and Robust Function Sharing,*" Proceedings of the 28th Annual Symposium on Theory of Computing, ACM, 1996, pp. 499–508 ("[FGY]"), or for super-safe prime RSA, one can use a technique from R. Genaro, S. Jarecki, H. Krawczyk, T. Rabin, "*Robust Threshold REA, Advances in Cryptology— Crypto 96 Proceedings,*" Lecture Notes in Computer Science, Vol. 1109, N. Koblitz ed., Springer-Verlag, 1996, pp. 157–172, ("[GJKR2]"). There are known random elements (generators of subgroups) $g_i$ and the result of the shareholder's function applied to them (which are called "witnesses"). For simplicity of presentation one can assume one such generator g of a maximal order. (Alternatively, one may use a number of random generators that are exponentiated separately and then are multiplied together with the message to create a checker data.) The protocol goes as follows:

1. The Verifier gives to shareholder i: the message m and checker $M = m^{q_0} g^{q_1}$ mod n for $q_0, q_1 \in R\{0, \ldots, n-1\}$.
2. The Verifier proves (e.g., in a two round protocol of [FGY]) that it knows the elements $q_0, q_1$.
3. Shareholder returns partial result $S_{m,i,\Lambda} = m^{s'_i}$ mod n and $H = M^{s'_i}$ mod n.
4. Let $S'_{m,i,\Lambda}$, $H'$ be received by Verifier. Then Verifier verifies that $(H')^{L^2} \equiv^? (S'_{m,i,\Lambda})^{L^2} \cdot_q (S'_i)^{q_1}$ mod n. If the test fails, then an error is detected.

An implementation which is a combined protocol which comprises of initial setup of shares distributed with published witnesses. The protocol of the section above titled "A Secure Threshold RSA Scheme," running with "Verify partial result" as above, is a "robust threshold RSA" which: (1) is optimal-resilience, and (2) has small permanent share size of the order of the size of the secret.

EMPLOYING A UNIT INTEGRITY FUNCTION WITHIN THE RESILIENT DISTRIBUTED CRYPTOGRAPHIC FUNCTION SERVER

Figure 9:
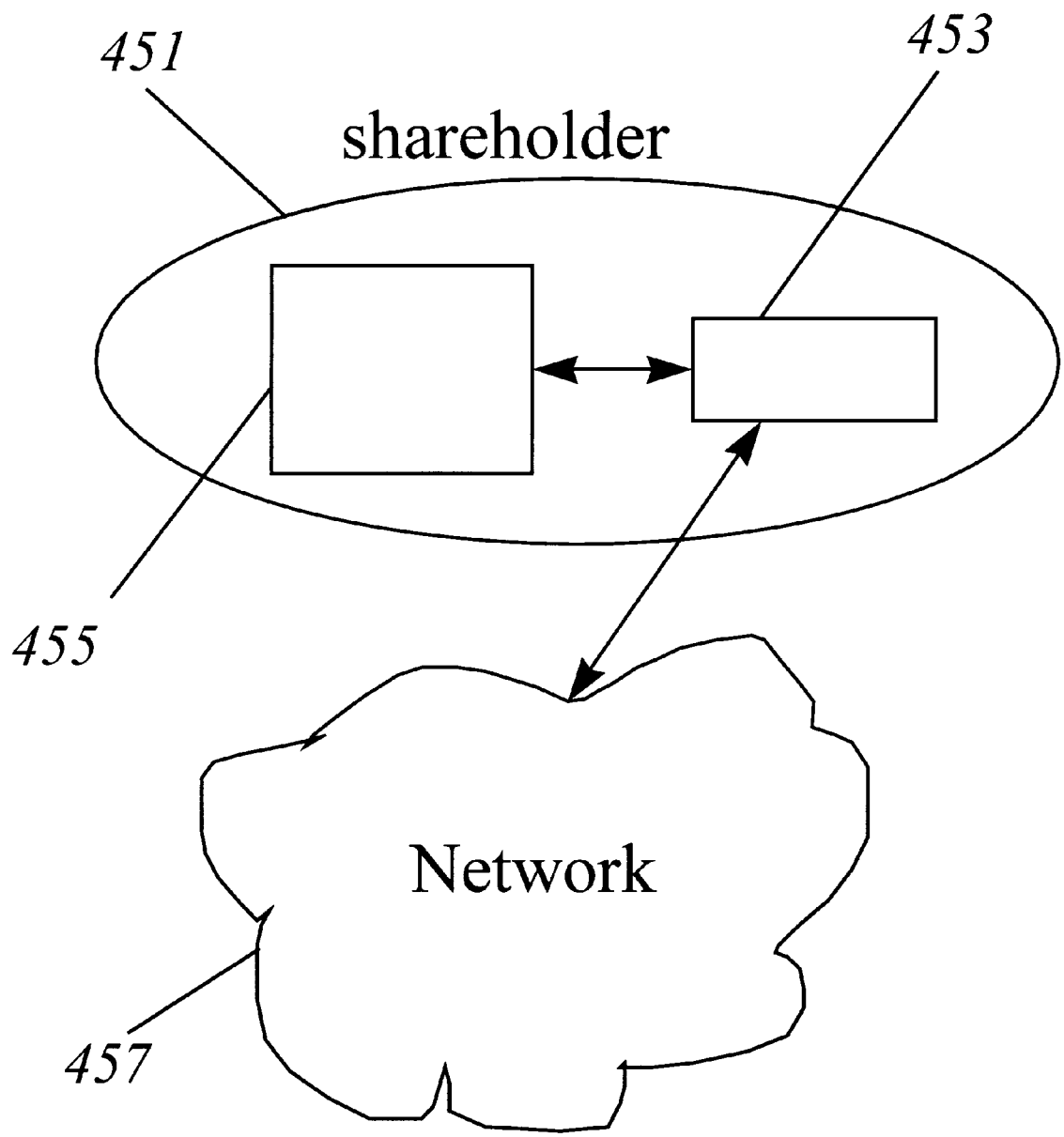
FIG. 9 illustrates an arrangement that provides an additional layer of protection in consideration of non-trusting entities.

Applications of the distributed cryptographic service of high resilience may be a sharing of a key by different organizations, with each organization holding a key share. Each organization may belong to a different country or to a different business entity, which makes the unit mutually distrustful. FIG. 9 illustrates an arrangement for a shareholder that provides an additional layer of protection in consideration of non-trusting entities. Item 451 designates a shareholder as an organization, while items 453 and 455 designate equipment units used by the organization 451. A measure of distrust arises, for example, when the source that built and/or designed the secret share holding/computing unit 455 is not entity 451. Therefore, there is a mutual distrust between the builder/designer of unit 455 and the user organization 451.

In this case each shareholder organization 451 entrusts its share to unit 455, but also relies on a second unit 453 whose task is assuring the integrity of unit 453. This unit-integrity unit 453 will work with the computing unit 455 to, e.g., (1) supply the computing unit 455 with random bits for computation, (2) engage in an "interactive checking protocol" to assure robustness and correctness of the result, and (3) prevent leakage of information out of the computing unit to the network 457. The integrity unit 453 will provide assurance not only that the correct output was presented by 455, but also that there are no subliminal channels, timing channels or other forms of covert channels. Other protection mechanisms may be enforced by the firewall as defined by policies. This provides a firewall protection for each of the units.

SMALL-SHARE ROBUST THRESHOLD RSA

Part of the reason that the above scheme has large shares is due to the need to have shares of a specific form to allow for proactivization. When proactivization is not needed, a secure threshold RSA scheme exists where shares are of the order of the RSA key. A "size efficient secure RSA function sharing" exists where a permanent share is only a small constant times the secret's size.

To implement this, let r(x) be as in the section above entitled "A Heuristic Threshold RSA Scheme." Distribute shares as $s_i = (r(i)/L) \mod \theta(n)$ which is possible since L divides r(i) in the integers. For the shares held after the poly-to-sum protocol, only $s_i' = s_i z_{i,\Lambda}/\gcd(L, \Pi_{j \in \Lambda \setminus \{i\}} (x_i - x_j))$ must be stored and $\gcd(L, \Pi_{j \in \Lambda \setminus \{i\}} (x_i - x_j))$ made publicly available to server.

All exponentiations are computed first with $s_i'$ and then raised by $\gcd(L, \Pi_{j \in \Lambda \setminus \{i\}} (x_i - x_j))$. Observe that the user must also possess a decryption key for the private computations.

SECURE PROACTIVE RSA

Figure 10:
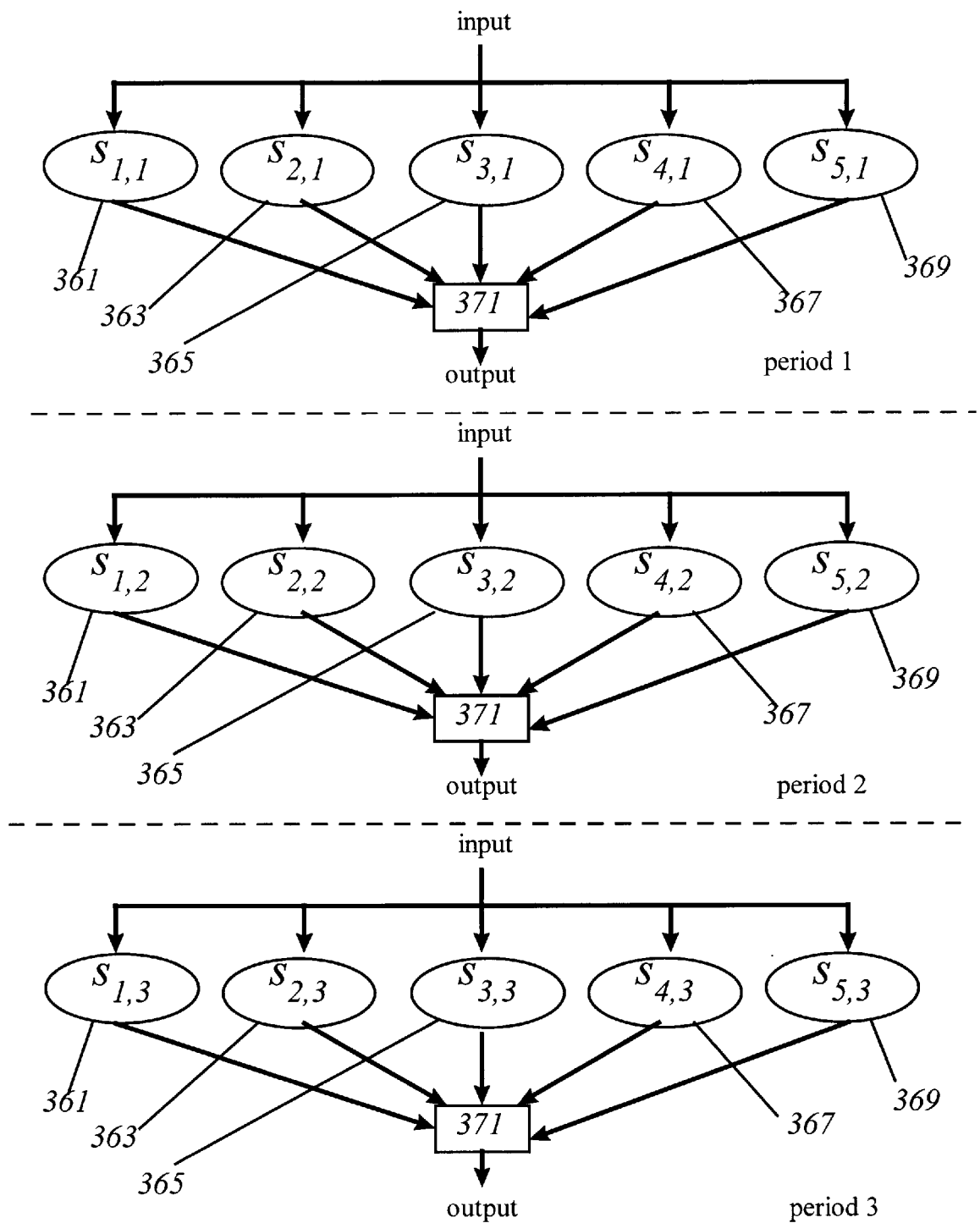
FIG. 10 illustrates reshuffling in a distributed system.

In order to protect against a mobile adversary, the shareholders reshuffle (re-randomize) their shares. If the adversary has access to the memory of a server at some point in time, and later the adversary is removed from the server, that past information is useless to the adversary after an update period. FIG. 10 illustrates reshuffling in a distributed system. A system of 5 servers 361, 363, 365, 367 and 369 have shares $s_{ij}$ which change as the time period changes. For instance, server 361 has share $s_{1,1}$ at time period 1, $s_{1,2}$ at time period 2, and $s_{1,3}$ at time period 3. The combining function 371 is not affected during the time periods but it is acceptable that a different server function as 371 within a single time period and between several time periods.

Discussed here is a secure proactive RSA protocol where in this variant of the implementation shares are refreshed.

SHARE DISTRIBUTION (SETUP): This is a setup as in the robust threshold RSA in the section "Robust Threshold RSA Scheme." The dealer generates an RSA with public key (e,n) and private key d. It then generates shares $s_{i,0}$ of $L^2.k'$ as in the section titled "A Heuristic Threshold RSA Scheme." The dealer also publishes $\{g, g^d\}$ for a $g \in Z^*_n$ of maximal order and for all i the value $g^{s_{1,0} \cdot L^2}$ mod n (if we employ more generators, it publishes this value with respect to each of them).

UPDATE PERIOD: Let $u \leftarrow u+1$.

SHARE RENEWAL AND RECOVERY: The intent is to make shares at time u+1 be t-wise independent of shares held at time u. A "poly-to-sum" share of shares protocol is performed to create a t-out-of-t sharing of $L^2.k' = W + \Sigma_{i \in \Lambda} s'_i$ where W is a public value divisible by $L^2$. Now the shares are additively shared, then subject to a "sum-to-poly" share-of-shares protocol. Namely, each server i shares its $s'_i$ (and the resulting public value W as well) with all servers j using the Shamir threshold scheme. Each of the l shareholders now sums up all the poly shares of each of the t share $s'_i$, generated by $\Lambda$. Hence each share holder will have a share of $L^2.k'$.

The protocol updates all users' shares. Hence, whether old shares exist (renewal) or do not exist (recovery) is irrelevant, since the newly dealt share becomes the mechanism by which signing is performed. The following is done:

1. Perform the "poly-to-sum" share of shares protocol (Section "Shares of Shares (Poly-to-Sum)") with shares from time u−1, $s_{i,u-1}$ until a set of t shareholders defined by $\Lambda$ have no dispute and agree to their respective shares $s'_i$ and the public W.

2. Perform the following "sum-to-poly" share of share protocol (the goal is to randomly re-share the value as the value of a polynomial in location l+1):

(a) Each $i \in \Lambda$ shares its $s'_i$ (the lowest numbered member also shares the public W in its share, i.e., $s'_i \leftarrow s'_i + W$ for smallest $i \in \Lambda$). The sharing is done by generating a random polynomial $r''_i(x)$ of degree t−1 with coefficients in $\{0, L, \ldots, L^3tc\}$, as in the section titled "A Heuristic Threshold RSA Scheme" and then computes $r'_i(x) = r''_i(x) - r''_i(l+1) + s'_i = \Sigma_{v=0}^{i-1} a_{i,v} x^v$, a polynomial to share $r'_i(l+1) + s'_i$ in which L divides all shares.

(b) Server $i \in \Lambda$ then publishes all the $g^{a_{i,v} \cdot L^2}$ and privately transmits $w_{ij} = r'_i(j) \in Z$ for $j \in \{1, \ldots, l\}$.

(c) Each server j verifies:
       Similar to P. Feldman, *A Practical Scheme for Non-interactive Verifiable Secret Sharing*, Proceedings of the 28th Symposium on Foundations of Computer Science, IEEE, 1987, pp.427–37 ("[F]"), verify (proper share): $g^{w_{ij} \cdot L^2} \equiv^? \Pi_{v=0}^{i-1} (g^{a_{i,v}})^{L^2 \cdot j^v}$ mod n
       verify (proper secret): $g^{s'_i L^2}$
       $\equiv^? \Pi (g^{a_{i,v}})^{L^2 \cdot (l+1)^v}$ mod n, where witness $g^{s'_i L^2} \equiv \Pi_{j \in \Lambda} R_{j,i}$ mod n is generated from public values in Section "Shares of Shares (poly-to-sum)".

verify correct form: L divides $w_{ij}$ (d) Then dispute resolution is performed. Detected faulty and corrupted system components (servers) are rebooted and the share renewal process continues from the beginning until there are no disputes.

(e) Now $s_{i,u} = \Sigma_{j \in \Lambda} w_{j,i}$. Erase previous history and retain new current share $s_{i,u}$. The $g^{s_{i,u} \cdot L^2}$ are published using the multiplication mod n of $g^{L^2 \cdot w_{i,j}}$.

3. The common "public" constants(such as the system size l, the public part of the key P, and the value of the generators) that are maintained proactively by a simple memory "refresh" procedure: each server sends to each server its current value and then the majority value becomes the new permanent value.

The size of the $w_{i,j}$ is sent via packets (fields) which are of fixed size large enough in order to prevent an attack in which the adversary sends such large shares that the shareholder cannot compute with efficiently.

RSA FUNCTION APPLICATION: Let time period be u. Performed exactly as the secure threshold RSA in Section entitled "A Secure Threshold RSA Scheme" with share $s_{i,u}$, if robustness is not required, otherwise perform, the computation with verification as in the protocol of the section entitled "Robust Threshold RSA Scheme."

Dynamic Management Function Sharing

The embodiment can serve other purposes. The above method is a very flexible transformation going from t-out-of-l to additive sharing t-out-of-t and back. One can, when going back, change the sharing threshold and increase the number of servers and have, say t'-out-of-l' (assuming, of course that at most t'−1 (if t'<t) can be corrupted at the update). Also, one can decrease the number of servers in a similar way and under analogous assumptions about corrupted servers. This demonstrates the strength of this flexible technique.

Figure 11:
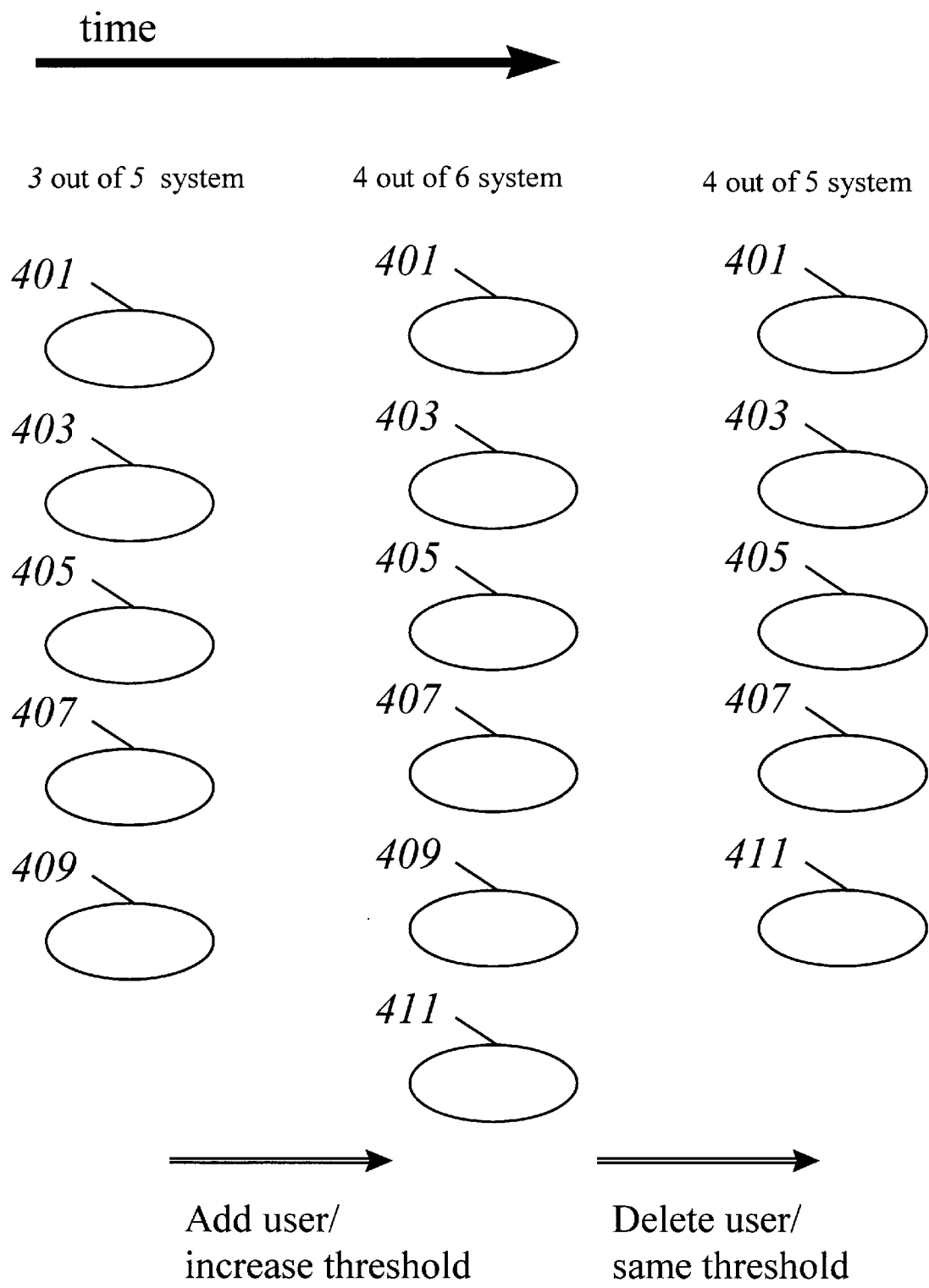
FIG. 11 illustrates a distributed system having changes in the number of users and threshold.

The system can change in multiple ways with respect to dynamic management: no change, add user/same threshold, add user/decrease threshold, add user/increase threshold, delete user/same threshold, delete user/decrease threshold and delete user/increase threshold. FIG. 11 illustrates a distributed system having changes in the number of users and threshold. In a system initially consisting of a 3-out-of-5 system with servers 401, 403, 405, 407 and 409, an "add user/increase threshold dynamic management" operation is performed to include server 411. After the "add user/increase threshold dynamic management" operation, the system is a 4-out-of-6 system. As also depicted in FIG. 11, if the delete user/same threshold dynamic management system is performed server 409 is removed and the system becomes a 4-out-of-5 system.

A Note: against an adversary that is only curious but does not affect memories of servers, namely it is not disruptive (malicious), one can have polynomial of larger degrees t even when t>n/2 when one is sure that t servers are always available (since the adversary only reads memories), and the adversary can control at most t−1 of them at any period.

A Generalized Embodiment of Proactive System

Figure 12:
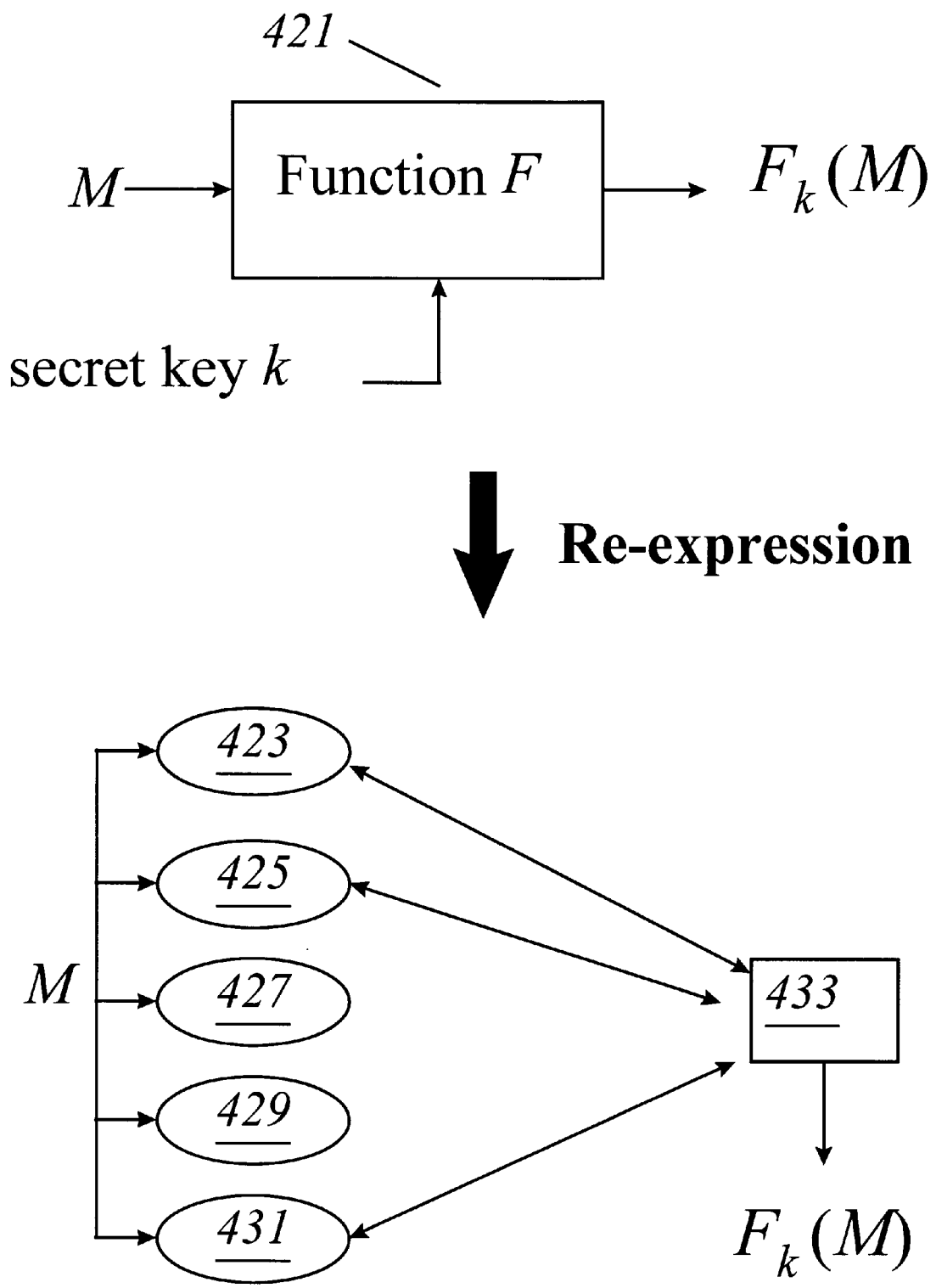
FIG. 12 illustrates the notion of sharing of a general homomorphic function.

FIG. 12 illustrates the notion of sharing of a general homomorphic function. The function F depicted as 421 accepts as input a message M and a secret key k, then given these two input values, returns result $F_k(M)$. The pro-active system re-expresses 421 (which is keyed with the secret k) by introducing servers 423, 425, 427, 429, 431 and 433. The illustrated system is a 3-out-of-5 system, in which any 3 of the servers chosen from 423, 425, 427, 429 and 431 can work together with 433 in order to generate the value $F_k(M)$ in a distributed fashion.

Discussed below is a generalization of the previous embodiment from an RSA system to a generalized set of functions which are called trapdoor permutations. A trapdoor permutation family was introduced by W. Diffie, and M. Hellman, *New Directions in Cryptography, IEEE Trans. on Information Theory*, 22 (6), 1976 ("[DH]") and is discussed below.

Definition 1: A trapdoor permutation family $\mathcal{T}_h$ consists of a polynomial time generator G that, when given an input $1^h$ (h the security parameter) returns (WLOG) a randomly drawn tuple consisting of two h bit strings (pu,se) where pu is a public key and se is the secret key. The keys define permutations, $f_{pu}(\bullet)$ and $f_{se}(\bullet)$ over the sample-able message space $\mathcal{D}_{pu}$ such that $f_{se}(\bullet)$ is the inverse function for $f_{pu}(\bullet)$ and given pu(se) applying $f_{pu}(\bullet)$ ($f_{se}(\bullet)$) is polynomial time.

Finding inverses of random values of a randomly chosen permutation without having the secret key se is hard. That is, for all probabilistic polynomial time algorithms A, for any polynomial poly($\bullet$), for all h large enough:

$$P[f_{pu}(u) = w : (pu, se) \leftarrow G(l^h);$$

$$w \in_R \{0, 1\}^h; u \leftarrow A(l^h, pu, w)] < \frac{1}{poly(h)}.$$

Recall that, $P[x:e_1; \ldots; e_j]$ is the standard notation for the probability of predicated x after the events $e_i$ occur (are executed) sequentially.

SUFFICIENT CONDITIONS

The following are sufficient conditions for the permutation. The notion of share-translation condition below provides sufficient algebraic properties to assure that a function is share-able.

Definition 2 (Share-Translation): Let the secret key be se=k. A trapdoor (hard to compute) permutation $f_k(\bullet)$ is share-translate-able when: 1) there exists an Abelian share space group $\mathcal{K}_{se}(+)$, where $k \in \mathcal{K}_{se}$, 2) there exists a polynomial time "mapping" 0 f: $\mathcal{K}_{se} \times \mathcal{D}_{pu} \to \mathcal{D}_{pu}$ such that $f_k = f_k$, 3) the probability that f is not defined for one or more randomly chosen poly(h) elements in $\mathcal{D}_{pu}$ is negligible, and 4) there exists an associated binary operation "*" for the set $\mathcal{D}_{pu}$ such that $f_{k1}(\alpha) * f_{k2}(\alpha) = f'_{k_1+k_2}(\alpha)$ for any k1, k2 $\in$ and $\mathcal{K}_{se}$ and a $\alpha \in \mathcal{D}_{pu}$.

A family of trapdoor permutations $\mathcal{T}_h$ is "share-translate-able if almost all elements in it are share-translate-able." A sufficient condition such that all of the operations in a function sharing primitive are computable in polynomial time in the security parameter was defined in A De Santis, Y. Desmedt, Y. Frankel, and M. Yung, *How to Share a Function Securely*, ACM Proceedings of the 26th Annual Symposium on Theory of Computing, ACM, 1994, pp. 522–533 ("[DDFY]"), and can be stated as follows.

Definition 3 (Share Efficiency): A trapdoor permutation is efficiently (polynomial time) share-translate-able when 1) given pu, multiplying elements and computing inverses in the message space $\mathcal{D}_{pu}$ is polynomial time in h, 2) share space $\mathcal{K}_{se}$ is a sample-able set, 3) the share space $\mathcal{K}_{se}(+)$ is an Abelian group such that given se one can perform the "+" and inverses in polynomial time in h, and 4) $\mathcal{K}_{se}$ as may be found in probabilistic polynomial time, given se.

A family of trapdoor permutations $\mathcal{T}_h$ is efficiently share-translate-able if almost every element in it is.

Share translation and share efficiency do not, on their own, guarantee security. For the function sharing protocol to be secure, all of the information the adversary receives must not allow it to break the system. To provide for security, all the information that the adversary would receive is simulate-able given public information.

The share space is often not sample-able as, for instance, the RSA function where the share space of the trapdoor permutation could be $\mathcal{K}_{se} = Z_{\phi(n)}(+)$. Leaking any information about $\phi(n)$ may compromise security. Picking a random number in $\{0, \ldots, \phi(n)-1\}$ can be simulated by $\mathcal{D}_{pu} = \{0, \ldots, n-1\}$ using only public information in order to provide a means in which to simulate share distribution.

The simulate-able property states that given public information only, one can, in polynomial time, simulate the actions of g (the shared function) and $\mathcal{K}_{se}$ via a function z (the simulate-able function) and $Z_{pu}$ (the simulate-able share space) respectively. This can be stated as follows.

Definition 4 (Simulate-able): Let (pu,se) $\in \mathcal{T}_h$ the input to a function sharing primitive. We say that the share function generation phase is simulate-able for $\mathcal{T}_h$ when: 1) there exists a probabilistic polynomial time algorithm $S_1$ which, when given pu, returns a polynomial space description of $Z_{pu}$ (defined below) and a polynomial time algorithm z: $Z_{pu} \times \mathcal{D}_{pu} \to \mathcal{D}_{pu}$, 2) there exists a probabilistic polynomial time algorithm $S_2$: $\{0,1\}^h \times \{0,1\}^h \mathcal{K}_{se} \to Z_{pu}$, such that $f'_k = z_k$ for $k \leftarrow S2(pu,se,k')$), and 3) distributions $\{x|x \in_R Z_{pu}\}$ and $\{x|y \in_R \mathcal{K}_{se}; x \leftarrow S_2(pu,se,y)\}$ are statistically indistinguishable.

A family of trapdoor permutations $\mathcal{T}_h$ is simulate-able if almost every element in it is.

EXTENSIONS OF THE KEY SPACE

Discussed below is a definition of the extensions of the key space and how operations are performed on this key space.

Definition 5 (Key Space Extension): Let Z[u] be an algebraic extension over the integers of degree m. The extended share space is the module $\mathcal{K}^{q-1} = \mathcal{K}_{se} \times \ldots \times \mathcal{K}_{se}$ (i.e., the direct product of m copies of $\mathcal{K}_{se}$) over Z[u].

On can create an extension of $\mathcal{K}_{se}$ which has the appropriate algebraic structure to perform Lagrange interpolation over any finite Abelian group uniformly for any l. Let q be a prime greater than or equal to l+1 and u be a root of the cyclotomic polynomial $p(x) = (x^q - 1)/(x-1) = \sum_{j=0}^{q-1} x^j$. This defines an extended key space $\mathbf{K}^{q-1} = \mathcal{K}_{se} \times \ldots \times \mathcal{K}_{se} \cong \mathcal{K}_{se}[x]/(p(x))$, the direct product of q-1 copies of $K_{se}$. We consider $K^{q-1}$ as a module over $Z[u] \cong Z[x]/(p(x))$ (i.e., the extension of integers with the element u).

Lemma 1: Let q be a prime greater than or equal to l+1, and u be a root of the cyclotomic polynomial $p(x) = (x^q - 1)/(x-1) = \sum_{j=0}^{q-1} x^j$. Let $x_i = \sum_{j=0}^{i-1} u^j$. Then $(x_i - x_j)^{-1}$ exists for $0 \leq i \leq l$.

Proof. Using the extended Euclidean algorithm [HW] $(x_i)^{-1}$, $0 \leq i \leq l$ is computed since $\gcd((u^q - 1)/(u-1), (u^i-1)/(u-1)) = (u^{\gcd(q,i)})/(u-1) = 1$ in $Z[u]$, $u-1|u^i-1$, and q is a prime. Moreover, $\gcd(u^q - 1, u^i) = 1$. From this it is easy to see that $(x_i - x_j) = 1^{q_0} u^{q_1} ((u^{q-2}-1)/(u-1))$, for some $q_1$, has an inverse for $0 \leq i \leq l$. Therefore, this module has a scalar in which the $x_i$ and $x_i - x_j (i \neq j)$ have inverses when $X_v = (u^v - 1)/(u-1) = \sum_{v''=0}^{v-1} u^{v''}$. This property is useful in creating a threshold scheme over this module.

Observe that $(u^i)^{-1} = u^{q-i}$. One can write elements $\mathcal{K}^{q-1}$ as $[k_0, \ldots, k_{q-2}]$ and the identity element as $[0, \ldots, 0]$ where 0 is the identity element of $\mathcal{K}_{se}(+)$. Addition in $\mathcal{K}^{q-1}(+)$ is defined as $[k_0, \ldots, k_{q-2}]+[k_0, \ldots, k_{q-2}]=[k_0+k_0, \ldots, k_{q-2}+k_{q-2}]$. The scalar operation $[b_0+\cdots+b_{q-2}u^{q-2})\cdot[k_0,\ldots,k_{q-2}]$ is defined recursively from $b.[k_0,\ldots,k_{q-2}]=[b.k_0,\ldots,b.k_{q-2}]$ for $b \in Z$ and $u.[k_0,\ldots,k_{q-2}]=[0, k_0, \ldots, k_{q-3}]+[-k_{q-2},\ldots,-k_{q-2}]$.

Definition 6 (Public Domain Extension): Let $Z$ [u] be an algebraic extension over the integers of degree m. The extended public domain is the module $\mathfrak{D}^{\bar{q}-1}= \mathfrak{D}_{pu} \times \cdots \times \mathfrak{D}_{pu}$ (i.e., the direct product of m copies of $\mathfrak{D}_{pu}$) over $Z$[u].

WLOG, one can assume the public domain is multiplicative. Similarly one can write elements $\mathfrak{D}^{\bar{q}-1}$ as $[m_0, \ldots, m_{q-2}]$ and the identity element as $[1, \ldots, 1]$, where 1 is the identity element of $\mathfrak{D}_{pu}(*)$. Multiplication in $\mathfrak{D}^{\bar{q}-1}(*)$ is defined as $[m_0, \ldots, m_{q-2}]*[m_0, \ldots, m_{q-2}]=[m_0 *m_0, \ldots, m_{q-2}*m_{q-2}]$. The scalar operation $[m_0, \ldots, m_{q-2}]^{(b_0+\cdots+b_{q-2}u^{q-2})}$ is defined recursively from $[m_0, \ldots, m_{q-2}]^b=[m_0^b, \ldots, m_{q-2}^b]$ for $b \in Z$ and $[m_0, \ldots, m_{q-2}]^u=[1, m_0, \ldots, m_{q-3}]*[m_{q-2}^{-1}, \ldots, m_{q-2}^{-1}]$ The DDFY Threshold Cryptosystem Based on the theoretical basis set forth above, a general protocol can be implemented as follows. It will be appreciated that many variations in the manner of the use of algebraic extensions are possible and that similar techniques as with the use of finite geometry are also possible. For instance, extension over the integers in which there exists sufficient interpolation points $x_v$, such that $x_i$ and $x_i-x_j$, where $i \neq j$, have inverses in the integer extension for all necessary interpolation points are usable.

Setup: Let $f_k(\bullet)$ be the function to be shared. Let $q>1$ be a prime and u be a root of the cyclotomic polynomial $p(x)=\Sigma_{j=0}^{q-1}x^j$. Let $x_i=\Sigma_{j=0}^{i-1}u^j$.

Share distribution phase: A random "polynomial" $r(x)=\Sigma_{v=0}^{i-1}\alpha_i x^i \in \mathbf{K}^{q-1}[x]$ is chosen such that $r[0, \ldots, 0]=[k, 0, \ldots, 0]$ and otherwise is random. It computes $s'_i=[c'_{i,0}, \ldots, c'_{i-q-2}]=r(x_i)$. It then publishes $(z^{-1}z_{pu}) \leftarrow S_1$ (pu) and i's private share is $s_i=[c_i, 0, \ldots, c_{i,q-2}]$ where $c_{ij}=S_2(pu, se, c'_{i,j})$.

Shared function evaluation phase: To jointly sign for a message m, server i transmits partial results, $S_{m,i}=[m, 1, \ldots, 1]^{S_i} \in \mathfrak{D}^{\bar{q}-1}$ to the combining function. Then the combining function calculates $$y_{i,\Lambda} = \prod_{\substack{v \in \Lambda \\ v \neq i}}(x_i-x_v)^{-1}(0-x_v) \quad (2)$$

and computes result $[f_k(m), \diamond, \ldots, \diamond]=\Pi i \in \Lambda(S_{m,i})^{y_{i,\Lambda}}$ where $\diamond$ represents an element in $\mathfrak{D}_{pu}$ which is not relevant.

For a function which satisfies Definitions 2, 3, and 4, the above is a secure and correct function sharing protocol. A. De Santis, Y. Desmedt, Y. Frankel and M. Yung, How to Share a Function Securely, ACM Proceedings of the 26th Annual symposium on Theory of Computing, ACM 1994, pp. 522–533.

The advantage of this is that this protocol is completely non-interactive. The share-holders never need to communicate with each other, directly or indirectly. This is due to the fact that a shareholder does not need to know the identity of the shareholders which it will do the distributed function sharing operation with. In practice, this may be very beneficial.

PRO-ACTIVIZATION

Discussed below is a method by which the protocol is proactivized as the preferred embodiment for generalized functions, beginning with the simulatability condition.

Definition 7 (Additive simulate-ability): Let $Z'_{pu}$ be the set of integers which contains $Z_{pu}$. Moreover, there exists a polynomial time (in the length) predicate called Mem such that Mem(a)=TRUE if and only if $a \in Z_{pu}$.

NOTE: it should be noted that $Z_{pu}$ and $Z'_{pu}$ (as denoted by pu) are different than $z_n$ the intergers modulo n.

The proactivization technique is to use the function application as above except that the update phase the poly-to-sum (see the section entitled "Shares of Shares (Poly-to-sum)" above) is followed by the sum-to-poly phase (see "Secure Proactive RSA" above). For robustness one can use techniques analogous to the ones used for RSA based on [FGY].

Definition 8 (Simulate-able Space Extension) Let $Z$[u] be an algebraic extension over the integers of degree m. The extended public domain is the set with binary operation $(+)z^{q-1}=z'_{pu}x \cdots \times z'_{pu}$ (i.e., the direct product of m copies of $Z'_{pu}$ over $Z$[u]).

WLOG, one can assume the simulate-able space is additive. Similarly one can write elements $Z^{q-1}$ as $[S_0, \ldots, S_{q-2}]$. Addition in $Z^q$ (+) is defined as $[s_0, \ldots, s_{q-2}]+[s'_0, \ldots, s'_{q-2}]=[s_0+s'_0, \ldots, s_{q-2}+s'_{q-2}]$. The scalar operation $(b_0+\cdots+b_{q-2}u^q)[s_0, \ldots, s_{q-2}]$ is defined recursively from $b.[s_0, \ldots, s_{q-2}]=[b.s_0, \ldots, b.s_{q-2}]$ for $b \in Z$ and $u.[s_0, \ldots, s_{q-2}]=[0, s_0, \ldots, s_{q-3}]+[-s_{q-2}, \ldots, -s_{q-2}]$.

OTHER FUNCTIONS

Proactive cryptosystems can also be based on cryptographic functions using discrete logarithms, including those defined over a composite. Hence for instance, El Gamal encryption can have an optimal resilience proactive system. RSA based variants such as elliptic curve RSA also have sufficient algebraic properties to be made proactive in accordance with the present invention.

POLY-TO-SUM WITH DDFY

Discussed below is a poly-to-sum method for the proactivization based on [DDFY]. Define selection function $\sigma_i$ as $\sigma_i([s'_0, \ldots, s'_{q-2}])=s'_i$.

Setup: Assume that the dealer during share distribution publishes an element $g=[g', 1, \ldots, 1]$ such that $g' \in \mathfrak{D}_{pu}$ is of maximal order and it publishes $S_i=g^{S_i}$ for all i. Let $\Lambda$ where $|\Lambda|=t$ be the shareholders (servers) participating in the share of shares protocol.

Sharing Shares: Server i

Generates $r_{i,j} \in_R Z_{pu}$.

Privately, transmit using probabilistic encryption over the public channel (an act which also publicly commits to the message) $r_{ij}$ to server j.

Sets the self-held share to be $r_{i,i}=\sigma_0(y_{i,\Lambda} \bullet s_i)-\Sigma_{j \in \Lambda \setminus \{i\}}r_{i,j} \in Z_{pu}$, ($y_{i,\Lambda}$ as in equation (2)).

Publish $R_{ij}=g^{r_{i,j}}$.

Verify and generate shares: Let $r_{ij}$ be the share received by j from i.

1. Each server j verifies that for all $i \in \Lambda / \{j\}$:
   $(S_i)^{V_1} \equiv^? \Pi_{v \in \Lambda}(R_{i,v})^{V_2}$ where $V_1=\Pi_{v \in \Lambda \setminus \{i\}}(0-x_v)$ and $V_2=\Pi_{v \in \Lambda \setminus \{i\}}(x_i-x_v)$.
   If the verification does not pass then server i is removed and new $\Lambda$ is chosen.
   for $i \neq j$, Mem$(r_{ij})=^?$True and $g^{r_{ij}} \equiv^? R_{ij}$
   If verifications are disputed by j, then $r_{ij}$ is revealed (decommited), and either i or j is removed appropriately. The protocol is halted.

2. If all verifications pass, shareholder's j new share is $s'_j = \Pi_{i \in \Lambda} r_{ij}$

THE PROACTIVIZED DDFY PROTOCOL

Share distribution (setup) Let u=0.

Let $k \in \mathbf{K}_{se}$ be the secret and let $f_k(\bullet)$ be the function to be shared. Let $q>1$ be a prime, u be a root of the cyclotomic polynomial $p(x)=\Sigma_{j=0}^{q-1}x^j$ and $x_i=\Sigma_{j=0}^{i-1}u^j$.

The dealer chooses a random "polynomial" $r(x)=\Sum_{v=0}^{i-1}\alpha_i x^i \in K^{q-1-1}[x]$ such that $r([0, \ldots, 0])=[k, 0, \ldots, 0]$ and otherwise is random. It computes $s'_i=[c'_{i,0}, \ldots, c'_{i,q-2}]=r(x_i)$. It publishes $(z^{-1}, Z_{pu}) \leftarrow S_1(pu)$ and privately transmits to server i share $s'_i=[c'_{i,0}, \ldots, c'_{i,q-2}]$ where $s'_i=[c'_{i,0}, \ldots, c'_{i,q-2}]$ and $c_{ij}=S_2(pu, se, c'_{i,j})$. The dealer publishes an element $g=[g', 1, \ldots, 1]$ such that $g' \in \mathbb{Z}_{pu}$ is of maximal order and it publishes $S_i=g^{si}$ for all i.

Update period: Let $u \leftarrow u+1$.

1. Perform the "poly-to-sum" share of shares protocol (Section entitled "Poly-to-sum with DDFY") with shares from time $u-1$, $s_{i,U-1}$, until a set of t shareholders defined by $\Lambda$ have no dispute and agree to shares their respective $s'_1$.

2. Perform the "sum-to-poly" share of share protocol:
   (a) Each $I \in \Lambda$ shares its $s'_i$ by generating a random polynomial $r'_i(x)=s'_i+\Sum_{v=1}^{t-1} a_{i,v} x^v$ of degree $t=1$ with coefficients $\alpha_{i,\cdot} \in_R Z^{q-1}$.
   (b) Server $i \in \Lambda$ then publishes all the $g^{a_{i,v}}$ and privately transmits $w_{i,j}=r'_i(x_j)$ for $j\in\{1, \ldots 1\}$.
   (c) Each server i verifies:
   Similar to [F] verify:
   $g^{W_{ij}} \equiv g^{s'_i} \Pi_{v=1}^{t-1} (g^{\alpha_{i,v}})^{(x_j)^v}$ where witness $g^{s'_i} = \Pi_{j \in \Lambda} R_{j,i}$ is generated from public values i (Section entitled "Shares of Shares (Poly-to-sum").
   (d) Then dispute resolution is performed. Detected faulty and corrupted systems are rebooted and the share renewal process continues from the beginning until there are not disputes.
   (e) Now $s_{i,u}=\Sum_{j \in \Lambda} w_{j,i}$. Erase previous history and retain new current share $s_{i,u}$. The $g^{S_{i,u}}$ are computed using the $g^{w_{ij}}$.

The size of the $w_{i,j}$ is sent via packets (fields) which are of fixed size large enough in order to prevent an attack in which the adversary sends such large shares that the shareholder cannot compute with efficiently.

Shared function application: Let time period be u. Performed as the [DDFY] scheme as presented in the section titled "The DDFY Threshold Cryptosystem" with share $s_{i,u}$ except that servers keys are in $Z'_{pu} \times \cdots \times Z'_{pu}$ rather than $Z_{pu} \times \cdots \times Z_{pu}$. For robustness, use [FGY] protocol using witness $g^{S_{i,u}}$.

The embodiments described herein use relatively efficient constructions that are based on servers evaluating and transmitting cryptographic functions' values. The techniques of the present invention can also be applied to less efficient communication constructions characterized by the theoretical notion of "secure circuit evaluation," where the communication is proportional to the size of circuits computing the cryptographic functions.

Another application of the "proactive model" is a flexible key management of shareholders in a function sharing scheme. It enables one to change the set of shareholders during the refreshing period by giving the recovered new share to a new server, rather than the old one. The protocols of the present invention extend this capability, and enable dynamic changes of the threshold value as well.

The previous discussion addressed certain "size parameters" (e.g., length of keys and of shares of keys etc.). It is contemplated that one would choose size, or relative size, of keys according to a notion of "security level" and its tradeoff against "performance level." For increased security one would choose a longer set of keys, and a longer key takes more memory space and more computation time to calculate. The size parameters can be varied as a system's parameter providing higher security when increased, or higher performance when decreased.

Other examples of applications of the present invention include: 1) as a certification authority where the distributed system is used to produce certificates based on authorized inputs, and 2) as an escrow agency in which shareholders are escrow agents, and a plurality of escrow agents are needed to create a decryption of authorized cyphertext to be taken off escrow.

The embodiments described herein are intended to be illustrative and not limiting. It will be appreciated that many variations are possible within the scope and spirit of the invention.

We claim:

1. A method of providing a cryptographic service comprising the steps of:

selecting a first function having properties useful for providing the cryptographic service;

re-expressing the first function as a first plurality of alternate functions;

distributing the first plurality of alternate functions to a plurality of distinct, electronic, cryptographic processing apparatus;

during a first operational period, (i) at each of a selected set of cryptographic processing apparatus, electronically applying at least one of the first plurality of alternate functions to a first input message to obtain first partial results, and (ii) combining first partial results to obtain a first final electronic output associated with the input message, said output-being identical to the output that would have been obtained by applying the first function to the input message;

during an update period, (i) generating a second plurality of alternate functions that re-express the first function, and (ii) distributing the second plurality of alternate functions to distinct cryptographic processing apparatus; and during a second operational period, (i) at each of a selected set of cryptographic processing apparatus, electronically applying at least one of the second plurality of alternate functions to a second input message to obtain second partial results, and (ii) combining second partial results to obtain a second final electronic output associated with the input message, said second output being identical to the output that would have been obtained by applying the first function to the second input message.

2. The method of claim 1 wherein the first function is an RSA function.

3. The method of claim 2 wherein the private key for the RSA function is over a subset of the integers.

4. The method of claim 1 wherein the first function is a cryptographic function having a key drawn from a group for which neither the order nor a multiple of the order is publicly known.

5. The method of claim 1 wherein the first function has a property of share translation.

6. The method of claim 1 wherein the first function has an associated share space and a property that inverses can be computed in the share space.

7. The method of claim 1 wherein the first function has an associated share space and a property that the share space is simulatable.

8. The method of claim 1 wherein each function of the first plurality of alternate functions is based on a generator over a finite field.

9. The method of claim 1 wherein each function of the first plurality of alternate functions is an exponentiation function.

10. The method of claim 1 wherein each function of a plurality of alternate functions is defined over a ring.

11. The method of claim 1 wherein each function of a plurality of alternate functions is defined over a group.

12. The method of claim 1 wherein each function of a plurality of alternate functions is defined over a subset of the integers.

13. The method of claim 1 wherein:
the first function is a cryptographic function having a key; and
the first function has a property that an inverse of the key cannot be computed practicably with publicly known information.

14. The method of claim 1 wherein the cryptographic service is a digital signature service.

15. The method of claim 1 wherein the cryptographic service is an encryption service.

16. The method of claim 1 wherein the cryptographic service is a decryption service.

17. The method of claim 1 wherein the cryptographic service is an authentication service.

18. The method of claim 1 wherein the step of generating a second plurality of alternate functions includes a step of re-expressing at least some of the first plurality of alternate functions as the second plurality of alternate functions.

19. The method of claim 1 wherein the step of generating a second plurality of alternate functions includes a step of rendering the set of cryptographic processing apparatus incapable of applying the first plurality of alternate functions.

20. The method of claim 1 wherein the step of re-expressing the first function as a first plurality of alternate functions includes a step of re-expressing the first function in the form of a t-of-l system, in which l is a number of cryptographic processing apparatus configured to provide partial results, and t is a minimum number of partial results needed to generate a final result that is the same result as would have been obtained by applying the first function to an input message.

21. The method of claim 20 wherein the number l is greater than the number t.

22. The method of claim 20 wherein the step generating a second plurality of alternate functions that re-expresses the first function includes a step of generating re-expression of the first function as a t' of l' system, in which l' is a number of cryptographic processing apparatus configured to provide partial results, and t' is a minimum number of partial results needed to generate a final result that is the same result as would have been obtained by applying the first function to an input message.

23. The method of claim 22 wherein the number l' is greater than the number t'.

24. The method of claim 22 wherein the number t' is not equal to the number t.

25. The method of claim of claim 22 wherein the number l' is not equal to the number l.

26. The method of claim 1 wherein the step of generating a second plurality of alternate functions that re-express the first function includes steps of:
re-expressing at least some of the first plurality of alternate functions in the form of a t'-of-t' system, and
re-expressing the t'-of-t' system in the form of the second plurality of alternate functions.

27. The method of claim 26 wherein the step of re-expressing at least some of the first plurality of alternate functions in the form of t'-of-t' system includes steps of:
(1) selecting a number, t', of cryptographic apparatus, and
(2) communicating information among the t' cryptographic processing apparatus using a protocol, such that any of the t' cryptographic apparatus, acting either singly or in concert, can detect whether another of the t' cromptographic processing apparatus is acting in violation of the protocol.

28. The method of claim 1 wherein any minority of the plurality of apparatus may malfunction arbitrarily.

29. A method of providing a public-key cryptographic service comprising the steps of:
selecting an RSA function having associated public and private keys;
re-expressing the RSA function as a first plurality of alternate functions;
distributing the first plurality of alternate functions to a plurality of distinct, electronic, cryptographic processing apparatus;
during a first operational period, (i) at each of a selected set of cryptographic processing apparatus, electronically applying at least one of the first plurality of alternate functions to a first input message to obtain first partial results, and (ii) combining first partial results to obtain a first final electronic output associated with the first input message, said first output being identical to the output that would have been obtained by applying the RSA function to the first input message;
during an update period, updating the plurality of distinct cryptographic processing apparatus by (i) generating a second plurality of alternate functions that re-express the RSA function, and (ii) distributing the second plurality of alternate functions to distinct cryptographic processing apparatus; and
during a second operational period, (i) at each of a selected set of cryptographic processing apparatus, electronically applying at least one of the second plurality of alternate functions to a second input message to obtain second partial results, and (ii) combining second partial results to obtain a second final electronic output associated with the second input message, said second output being identical to the output that-would have been obtained by applying the RSA function to the second input message.

30. The method of claim 29 wherein the private key for the RSA function is over a subset of the integers.

31. The method of claim 29 wherein each function of the first plurality of alternate functions employs a generator.

32. The method of claim 29 wherein each function of the first plurality of alternate functions is an exponentiation function.

33. The method of claim 29 wherein each function of a plurality of alternate functions is defined over a ring.

34. The method of claim 29 wherein each function of a plurality of alternate functions is defined over a group.

35. The method of claim 29 wherein each function of a plurality of alternate functions is defined over a subset of the integers.

36. The method of claim 29 wherein the step of generating a second plurality of alternate functions includes a step of re-expressing at least some of the first plurality of alternate functions as the second plurality of alternate functions.

37. The method of claim 29 wherein the step of generating a second plurality of alternate functions includes a step of rendering the set of cryptographic processing apparatus incapable of applying the first plurality of alternate functions.

38. The method of claim 29 wherein the step of re-expressing the first function as a first plurality of alternate functions includes a step of re-expressing the first function in the form of a t-of-l system, in which l is a number of cryptographic processing apparatus configured to provide partial results, and t is a minimum number of partial results needed to generate a final result that is the same result as would have been obtained by applying the first function to an input message.

39. The method of claim 38 wherein the number l is greater than the number t.

40. The method of claim 38 wherein the step generating a second plurality of alternate functions that re-expresses the first function includes a step of generating re-expression of the first function as a t' of l' system, in which l' is a number of cryptographic processing apparatus configured to provide partial results, and t' is a minimum number of partial results needed to generate a final result that is the same result as would have been obtained by applying the first function to an input message.

41. The method of claim 40 wherein the number l' is greater than the number t'.

42. The method of claim 40 wherein the number t' is not equal to the number t.

43. The method of claim of claim 40 wherein the number l' is not equal to the number l.

44. The method of claim 29 wherein the step of generating a second plurality of alternate functions that re-express the first function includes steps of:

re-expressing at least some of the first plurality of alternate functions in the form of a t'-of-t' system, and re-expressing the t'-of-t' system in the form of the second plurality of alternate functions.

45. The method of claim 44 wherein the step of re-expressing at least some of the first plurality of alternate functions in the form of a t'-of-t' system includes steps of:

(1) selecting a subset number, t', of cryptographic processing apparatus, and (2) communicating information among the t' cryptographic processing apparatus using a protocol, such that any of the t' cryptographic processing apparatus, acting either singly or in concert, can detect whether another of the t' cryptographic processing apparatus is acting in violation of the protocol.

46. The method of claim 29 wherein any minority of the plurality of apparatus may malfunction arbitrarily.

47. A method of providing a cryptographic service comprising the steps of:

selecting a first relation, said relation having properties useful for providing a cryptographic service, in connection with a public key and a private key drawn from a domain for which neither the order nor a multiple of the order is publicly known;

re-expressing the first relation as a first plurality of alternate relations;

distributing the first plurality of alternate relations to a plurality of distinct, electronic, cryptographic processing apparatus;

during a first operational period, (i) at each of a selected set of cryptographic processing apparatus, electronically applying at least one of the first plurality of alternate relations to a first input message to obtain first partial results, and (ii) combining first partial results to obtain a first final electronic output associated with the input message, said first output being a legitimate result that can be processed using one of said public and private keys as if it had been obtained by applying the first relation to the first input message;

during an update period, updating the plurality of distinct cryptographic processing apparatus by (i) generating a second plurality of alternate relations that re-express the first relation, and (ii) distributing the second plurality of alternate relations to distinct cryptographic processing apparatus; and during a second operational period, (i) at each of a selected set of cryptographic processing apparatus, electronically applying at least one of the second plurality of alternate relations to a second input message to obtain second partial results, and (ii) combining second partial results to obtain a second final electronic output associated with the second input message, said second output being a legitimate result that can be processed using one of said public and private keys as if it had been obtained by applying the first relation to the second input message.

48. The method of claim 47 wherein the first relation has a property of share translation.

49. The method of claim 47 wherein the first relation has an associated share space and a property that inverses can be computed in the share space.

50. The method of claim 47 wherein the first relation has an associated share space and a property that the share space is simulatable.

51. The method of claim 47 wherein each relation of the first plurality of alternate relations is based on a generator over a finite field.

52. The method of claim 47 wherein each relation of the first plurality of alternate relations is an exponentiation relation.

53. The method of claim 47 wherein each relation of a plurality of alternate relations is defined over a ring.

54. The method of claim 47 wherein each relation of a plurality of alternate relations is defined over a group.

55. The method of claim 47 wherein each relation of a plurality of alternate relations is defined over a subset of the integers.

56. The method of claim 47 wherein:

the first relation is a cryptographic relation having a key; and the first relation has a property that an inverse of the key cannot be computed practicably with publicly known information.

57. The method of claim 47 wherein the cryptographic service is a digital signature service.

58. The method of claim 47 wherein the cryptographic service is an encryption service.

59. The method of claim 47 wherein the cryptographic service is a decryption service.

60. The method of claim 47 wherein the cryptographic service is an authentication service.

61. The method of claim 47 wherein the step of generating a second plurality of alternate relations includes a step of re-expressing at least some of the first plurality of alternate relations as the second plurality of alternate relations.

62. The method of claim 47 wherein the step of generating a second plurality of alternate relations includes a step of rendering the set of cryptographic processing apparatus incapable of applying the first plurality of alternate relations.

63. The method of claim 47 wherein the step of re-expressing the first relation as a first plurality of alternate relations includes a step of re-expressing the first relation in the form of a t-of-l system, in which l is a number of cryptographic processing apparatus configured to provide partial results, and t is a minimum number of partial results needed to generate a final result.

64. The method of claim 63 wherein the number l is greater than the number t.

65. The method of claim 63 wherein the step of generating a second plurality of alternate relations that re-expresses the first relation includes a step of generating re-expression of the first relation as a t' of l' system, in which l' is a number of cryptographic processing apparatus configured to provide partial results, and t' is a minimum number of partial results needed to generate a final result that is the same result as would have been obtained by applying the first relation to an input message.

66. The method of claim 65 wherein the number l' is greater than the number t'.

67. The method of claim 65 wherein the number t' is not equal to the number t.

68. The method of claim of claim 65 wherein the number l' is not equal to the number l.

69. The method of claim 47 wherein the step of generating a second plurality of alternate relations that re-express the first relation includes steps of:

re-expressing at least some of the first plurality of alternate relations in the form of a t'-of-t' system, and re-expressing the t'-of-t' system in the form of the second plurality of alternate relations.

70. The method of claim 69 wherein the step of re-expressing at least some of the first plurality of alternate relations in the form of a t'-of-t' system includes steps of:

(1) selecting a subset number, t', of cryptographic processing apparatus, and (2) communicating information among a subset number t' of cryptographic processing apparatus using a protocol, such that any of the t' cryptographic processing apparatus, acting either singly or in concert, can detect whether another of the t' crytographic processing apparatus is acting in violation of the protocol.

71. The method of claim 47 wherein any minority of the plurality of apparatus may malfunction arbitrarily.

* * * * *